(12) United States Patent
Okada

(10) Patent No.: US 8,689,660 B2
(45) Date of Patent: Apr. 8, 2014

(54) STEERING DEVICE

(75) Inventor: Shinji Okada, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/379,251

(22) PCT Filed: Aug. 29, 2011

(86) PCT No.: PCT/JP2011/069505
§ 371 (c)(1),
(2), (4) Date: May 23, 2013

(87) PCT Pub. No.: WO2012/035967
PCT Pub. Date: Mar. 22, 2012

(65) Prior Publication Data
US 2013/0228032 A1    Sep. 5, 2013

(30) Foreign Application Priority Data
Sep. 14, 2010    (JP) .................. 2010-205347

(51) Int. Cl.
B62D 1/18    (2006.01)
(52) U.S. Cl.
USPC ........................................... 74/493; 280/775

(58) Field of Classification Search
USPC ...................... 74/492, 493; 280/775
See application file for complete search history.

(56) References Cited

U.S. PATENT DOCUMENTS

| 5,213,004 A * | 5/1993 | Hoblingre ...................... 74/493 |
| 5,301,567 A * | 4/1994 | Snell et al. ...................... 74/493 |
| 7,717,011 B2 * | 5/2010 | Hirooka ......................... 74/493 |
| 2004/0134302 A1 * | 7/2004 | Ko et al. ........................ 74/493 |

* cited by examiner

Primary Examiner — Justin Krause
(74) Attorney, Agent, or Firm — Crowell & Moring LLP

(57) ABSTRACT

A steering device provides a driver operation feeling that lets the driver definitely feel that a movable tilt lock gear and a fixed tilt lock gear are securely engaged. Gear noise in tilt adjustment when the movable tilt lock gear and the fixed tilt lock gear are engaged halfway is prevented. As the control force of an operating lever is rapidly decreased when a fitting protrusion is fitted to a stepped part, a click and click stop feeling occur and a definite operation feeling that the clamping is securely performed is acquired. As the fitting protrusion is integrated with the operating lever and a sliding surface configured by a groove, an inclined face and the stepped part are also formed as an outside face of the fixed tilt lock gear, the number of parts and man-hours for assembly can be reduced.

8 Claims, 19 Drawing Sheets (b)

(a)

(a)

(b)

(a)

(b)

US 8,689,660 B2

STEERING DEVICE

TECHNICAL FIELD

The present invention relates to a steering device, particularly a tilt type steering device in which a tilt position of a steering wheel can be adjusted according to the physique and posture in driving of a driver or a tilt telescopic type steering device in which a telescopic type is used together with the tilt type.

BACKGROUND ART

A tilt position adjustment mechanism is a mechanism for adjusting a tilt angle of a steering wheel in a position where a driver can most acquire drive ability in accordance with the physique and preference of the driver. When the tilt angle of the steering wheel is adjusted, a tilt clamping mechanism is once unclamped and after the tilt angle of the steering wheel is continuously adjusted in that state, the tilt angle of the steering wheel is clamped again.

In a steering device provided with such a tilt position adjustment mechanism, a bracket for installing on a vehicle body is fixed to the vehicle body and a clamping rod is inserted into a long groove for tilt adjustment of the bracket for installing on the vehicle body and a column. In clamping a tilt, the tilt is clamped by axially pressing a fixed cam with a movable cam turned by the operation of an operating lever, clamping the clamping rod and pressing the column on the bracket for installing on the vehicle body. However, when the clamping force of the clamping rod is weak, the column is moved in a tilted direction in secondary collision in which a driver violently collides with the steering wheel and it is feared that an air bag provided to the steering wheel cannot receive occupants in an effective position.

For a mechanism for blocking the movement of the column in such secondary collision, a tilt clamping mechanism where a fixed tilt lock gear is provided to a side plate of a bracket for installing on a vehicle body and a clamping rod is inserted into a movable tilt lock gear engaged with the fixed tilt lock gear is proposed.

Owing to this configuration, in clamping a tilt, the clamping rod is clamped by the operation of an operating lever, holding power in a tilted direction is enhanced by engaging the movable tilt lock gear with the fixed tilt lock gear, and even if an impact load by the secondary collision acts on a steering wheel, a column is prevented from being moved in the tilted direction.

In such a steering device in which the holding power in the tilted direction is enhanced, when the operation of the operating lever in clamping the tilt is insufficient, the engagement of the movable tilt lock gear and the fixed tilt lock gear is insufficient and when the impact load by the secondary collision acts on the steering wheel, the column may be moved in the tilted direction.

In a steering device provided with a tilt clamping mechanism disclosed in International Publication No. WO2008/056711, a wire spring configured by another part is attached to a fixed tilt lock gear or an operating lever, the wire spring is fitted to the mated part via respective convex and concave portions and gives click stop feeling, and operation feeling that a movable tilt lock gear and the fixed tilt lock gear are securely engaged is acquired.

However, in the steering device provided with the tilt clamping mechanism disclosed in International Publication No. WO2008/056711, as the wire spring is configured by another part, the number of parts and a man-hour for assembly increase and the manufacturing cost is increased. Besides, when the operation of the operating lever in unclamping the tilt is insufficient, the movable tilt lock gear and the fixed tilt lock gear are engaged halfway and gear noise may be made in tilt adjustment.

International Publication No. WO2008/056711

SUMMARY OF THE INVENTION

Problem to be Solved by the Invention

An object of the present invention is to provide a steering device where operation feeling that makes a driver definitely feel that a movable tilt lock gear and a fixed tilt lock gear are securely engaged is acquired, gear noise in tilt adjustment caused in tilt position adjustment when the movable tilt lock gear and the fixed tilt lock gear are engaged halfway is prevented, tilt position adjustment in unclamping a tilt can be smoothly made and the number of parts and a man-hour for assembly can be reduced.

Means for Solving the Problem

The above-mentioned problem is solved by the following device. That is, a first invention relates to a steering device provided with a bracket for installing on a vehicle body that can be installed on the vehicle body, a column which is supported by the bracket for installing on the vehicle body so that its tilt position can be adjusted and which turnably supports a steering shaft to which a steering wheel is attached, a clamping rod inserted into long grooves for tilt adjustment formed on side plates and the column so as to clamp the column on a pair of right and left side plates of the bracket for installing on the vehicle body in a desired tilt position and clamp a tilt, a fixed cam which is supported by one end of the clamping rod and which presses an inside face of one side plate of the bracket for installing on the vehicle body on the column, a movable cam turnably supported opposite to the fixed cam together with an operating lever by one end of the clamping rod, a cam face each of which is provided to each opposite face of the fixed cam and the movable cam and which relatively axially presses the movable cam on the fixed cam, a detent formed on the fixed cam so as to disable the relative turning of the fixed cam for the movable cam, fitted into the long groove for tilt adjustment and slidable along the long groove for tilt adjustment in adjusting the tilt position of the column, a fixed tilt lock gear attached to an outside face of one side plate of the bracket for installing on the vehicle body, a movable tilt lock gear turned in synchronization with the turning of the operating lever and engageable with the fixed tilt lock gear, a fitting protrusion turned in synchronization with the turning of the operating lever and formed at an end of an elastically deformed part, a sliding surface which is provided to the bracket for installing on the vehicle body and to which the fitting protrusion is slidably touched and is ordinarily touchable, a stepped part which is formed on the sliding surface across length for tilt adjustment, to which the fitting protrusion is fitted when the column is clamped and clamping is performed and which blocks the turning in a direction in which clamping is released of the operating lever, a groove which is formed on the sliding surface across length for tilt adjustment, into which the fitting protrusion is fitted when the clamping of the column is released and unclamping is performed and which blocks the turning of the operating lever and an inclined face which is formed between the stepped part and the groove on the sliding surface across length for tilt adjustment, on which the fitting protrusion is slid when the operating lever is turned and which ordinarily presses the operating lever in the direction in which clamping is released.

A second invention relates to a steering device based upon the steering device according to the first invention and having a characteristic that the sliding surface is formed as an outside face of the fixed tilt lock gear.

A third invention relates to a steering device based upon the steering device according to the first invention and having a characteristic that the operating lever is made of synthetic resin and the fitting protrusion is integrated with the operating lever.

A fourth invention relates to a steering device based upon the steering device according to any of the first to third inventions and having a characteristic that the movable tilt lock gear in which the fixed cam is packaged movably in a tilted direction and a spring which is inserted between the movable tilt lock gear and the fixed cam, which grasps a peripheral face of the fixed cam and which elastically supports the movement in the tilted direction of the movable tilt lock gear in terms of the fixed cam are provided.

A fifth invention relates to a steering device based upon the steering device according to the fourth invention and having a characteristic that the spring is elastically deformed by reaction force when threads of the movable tilt lock gear and the fixed tilt lock gear are touched in clamping the column on the bracket for installing on the vehicle body and the movable tilt lock gear is moved in the tilted direction opposite to the fixed tilt lock gear.

A sixth invention relates to a steering device based upon the steering device according to the fifth invention and having a characteristic that when the clamping of the column on the bracket for installing on the vehicle body is released, the engagement of the movable tilt lock gear is easily disengaged from the fixed tilt lock gear owing to clearance in a vertical direction of the vehicle body between the fixed cam and the movable tilt lock gear.

Effect of the Invention

The steering device according to the present invention is provided with the fixed tilt lock gear attached to the outside face of one side plate of the bracket for installing on the vehicle body, the movable tilt lock gear which is turned in synchronization with the turning of the operating lever and which can be engaged with the fixed tilt lock gear, the fitting protrusion turned in synchronization with the turning of the operating lever and formed at the end of the elastically deformed part, the sliding surface which is provided to the bracket for installing on the vehicle body and to which the fitting protrusion is slidably touched and is ordinarily touchable, the stepped part which is formed on the sliding surface across length for tilt adjustment, to which the fitting protrusion is fitted in clamping by clamping the column and which blocks the turning in the direction in which clamping is released of the operating lever, the groove which is formed on the sliding surface across length for tilt adjustment, into which the fitting protrusion is fitted in unclamping by releasing the clamping of the column and which blocks the turning of the operating lever and the inclined face which is formed between the stepped part and the groove of the sliding surface across length for tilt adjustment, on which the fitting protrusion is slid when the operating lever is turned and which ordinarily presses the operating lever in the direction in which clamping is released.

As the fitting protrusion is fitted to the stepped part and definite operation feeling that clamping is securely performed is acquired when the movable tilt lock gear is engaged with the fixed tilt lock gear and clamping operation is completed, the operation feeling is superior. Besides, pressure in the direction in which clamping is released acts on the operating lever by the touch of the fitting protrusion and the inclined face. Accordingly, even if a hand is separated from the operating lever in an intermediate position between a clamping position and an unclamping position, the operating lever is automatically moved to the unclamping position. Therefore, gear noise made by the unsatisfactory engagement of the movable tilt lock gear and the fixed tilt lock gear can be prevented. Besides, as the fitting protrusion is integrated with the operating lever and the sliding surface configured by the groove, the inclined face and the stepped part is also formed as the outside face of the fixed tilt lock gear, the number of parts and a man-hour for assembly can be reduced and the manufacturing cost can be reduced.

BRIEF DESCRIPTION OF THE DRAWINGS

FIG. 10(a) is a front view, FIG. 10(b) is a sectional view viewed along a line A-A in FIG. 10(a), and FIG. 10C is a sectional view viewed along a line B-B in FIG. 10(a);

FIG. 12(a) is the perspective view when FIG. 10(a) is viewed from the diagonal right, and FIG. 12(b) is the perspective view when FIG. 10(a) is viewed from the diagonal left;

FIG. 13(a) is a perspective view viewed from the side of an inclined cam face of the fixed cam, FIG. 13(b) is a perspective view viewed from the side of a detent of the fixed cam, and FIG. 13C is a front view viewed from the side of the detent of the fixed cam;

FIG. 14(a) is the perspective view showing the tilt stopper viewed from the side of a fitting protrusion, and FIG. 14(b) is the perspective view showing the tilt stopper viewed from the side of a flange part;

FIG. 15(a) is a front view showing the tilt stopper, FIG. 15(b) is a left side view of FIG. 15(a), FIG. 15(c) is a right side view of FIG. 15(a), and FIG. 15(d) is a top view of FIG. 15(a);

FIG. 16(a) is the perspective view showing the fixed tilt lock gear when it is viewed from the diagonal downside of the outside in a direction of vehicle width, and FIG. 16(b) is the perspective view viewed from the further downside of FIG. 16(a);

FIG. 17(a) is a front view showing the fixed tilt lock gear, FIG. 17(b) is a top view of FIG. 17(a), and FIG. 17(c) is a bottom view of FIG. 17(a);

DESCRIPTION OF EMBODIMENTS

In the following embodiment, an example in which the present invention is applied to a tilt telescopic type steering device where both a vertical position and a longitudinal position of a steering wheel are adjusted will be described.

Figure 1:
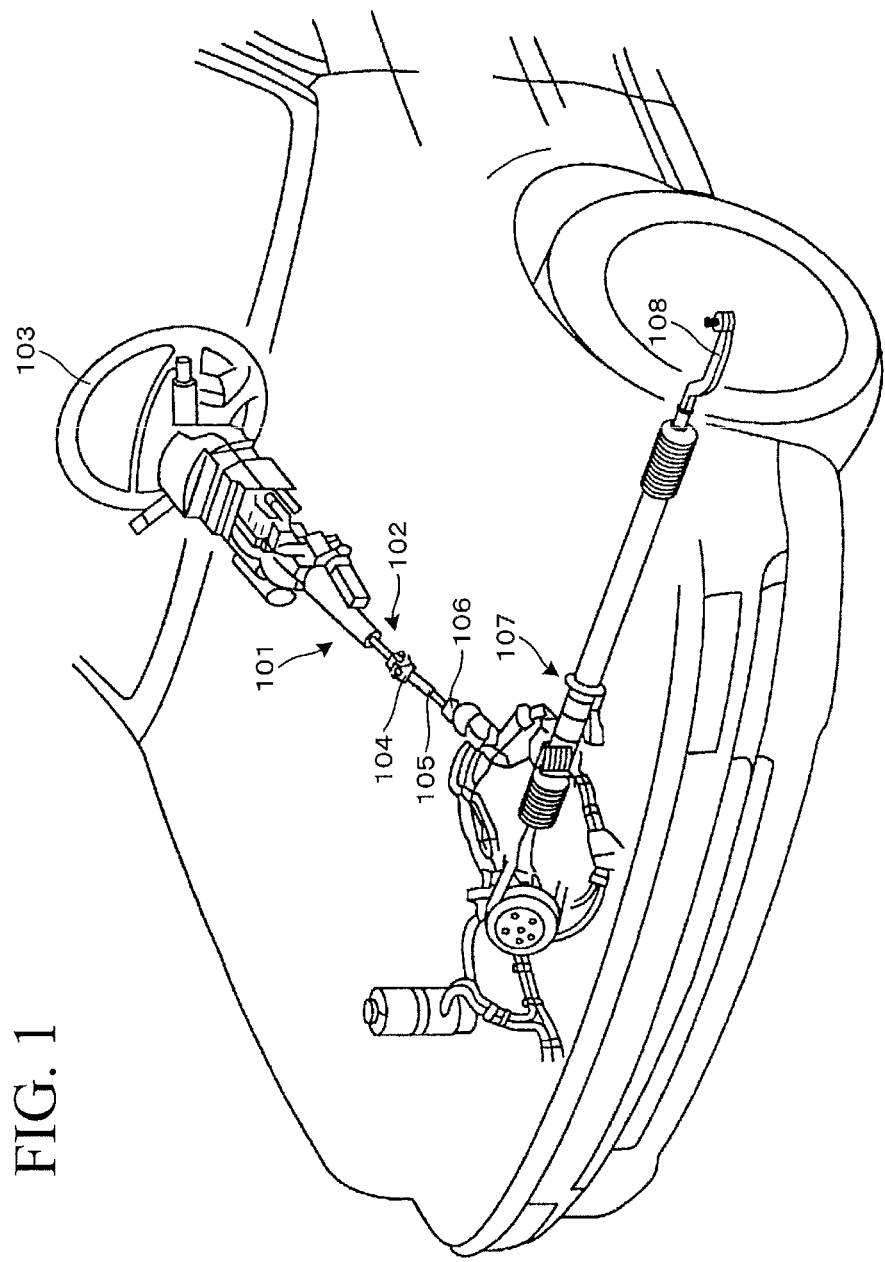
FIG. 1 is a general perspective view showing a state in which a steering device 101 according to the present invention is attached to a vehicle.

FIG. 1 is a general perspective view showing a state in which a steering device 101 according to the present invention is attached to a vehicle. The steering device 101 turnably supports a steering shaft 102. A steering wheel 103 is installed at an upper end located on the rear side in a vehicle body of the steering shaft 102 and an intermediate shaft 105 is coupled to a lower end located on the front side in the vehicle body of the steering shaft 102 via a universal joint 104.

A universal joint 106 is coupled to a lower end of the intermediate shaft 105 and a steering gear 107 configured by a rack and pinion mechanism and others is coupled to the universal joint 106.

When a driver rotates the steering wheel 103, its torque is transmitted to the steering gear 107 via the steering shaft 102, the universal joint 104, the intermediate shaft 105 and the universal joint 106, moves a tie rod 108 via the rack and pinion mechanism, and can shift a steering angle of a vehicle wheel.

Figure 2:
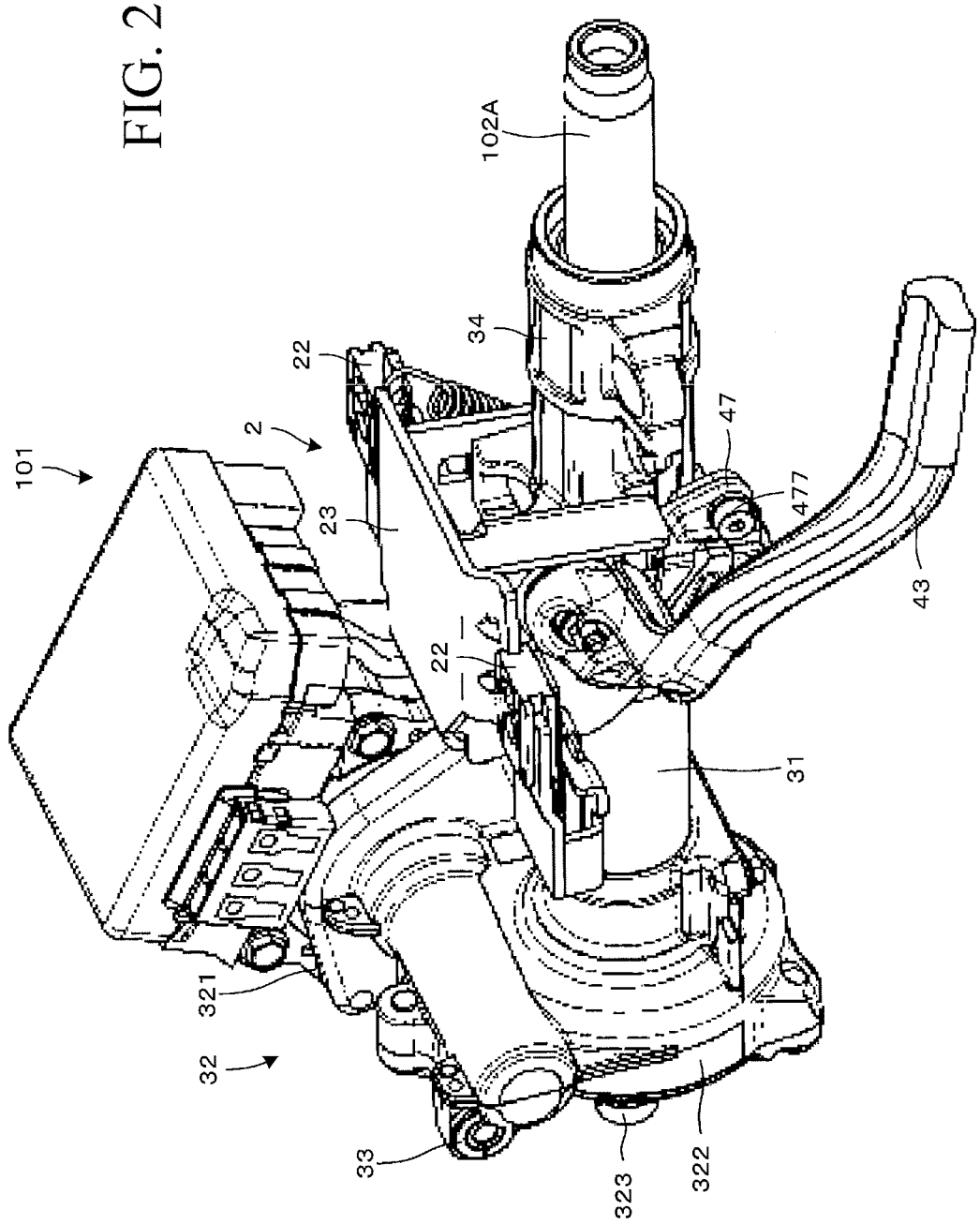
FIG. 2 is a perspective view showing a main part of a steering device 101 in an embodiment of the present invention when the steering device is viewed from the left upside of a rear side in a vehicle body.
Figure 3:
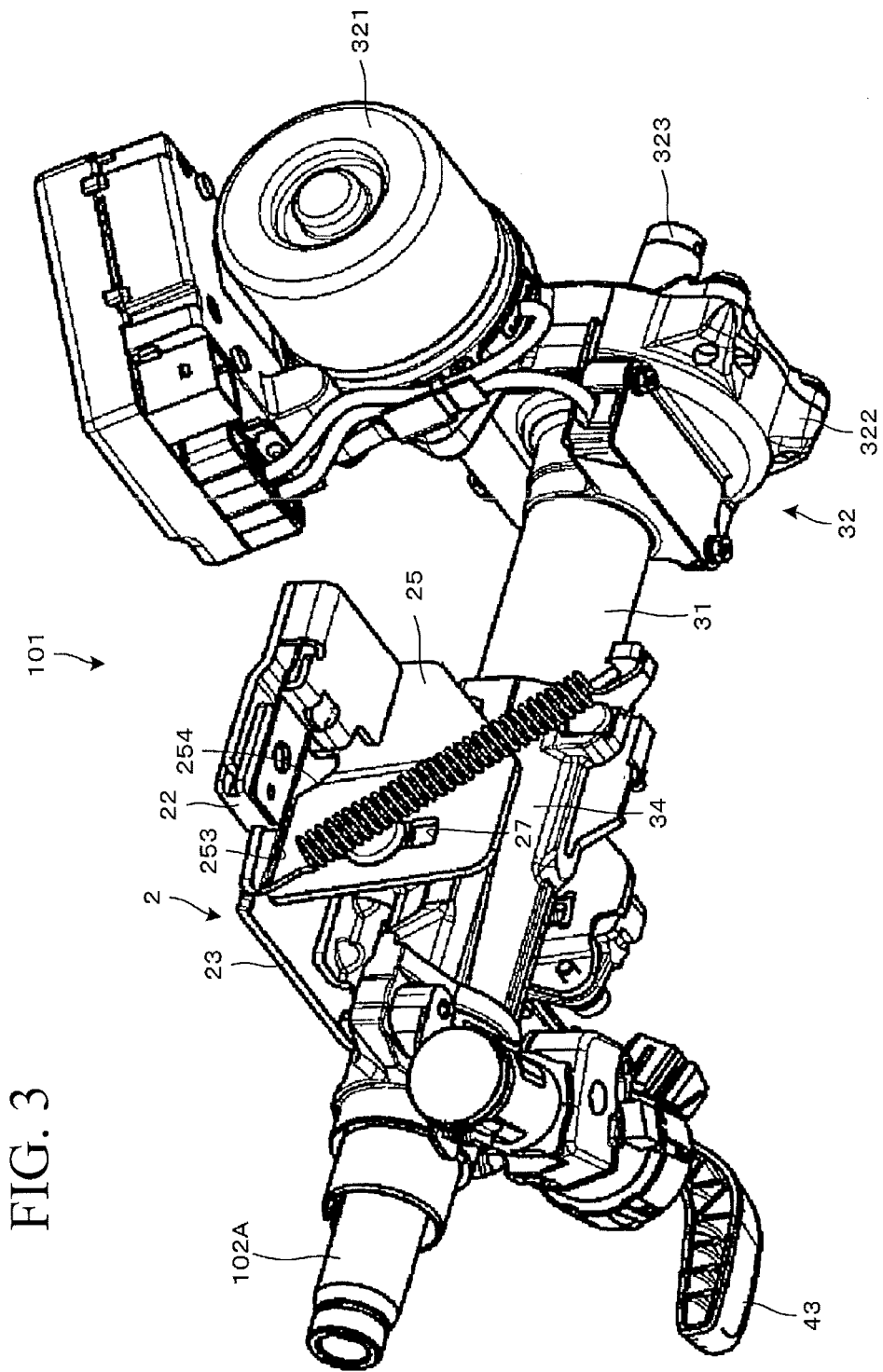
FIG. 3 is a perspective view showing the main part of the steering device 101 in the embodiment of the present invention when the steering device is viewed from the right downside of the rear side in the vehicle body.
Figure 4:
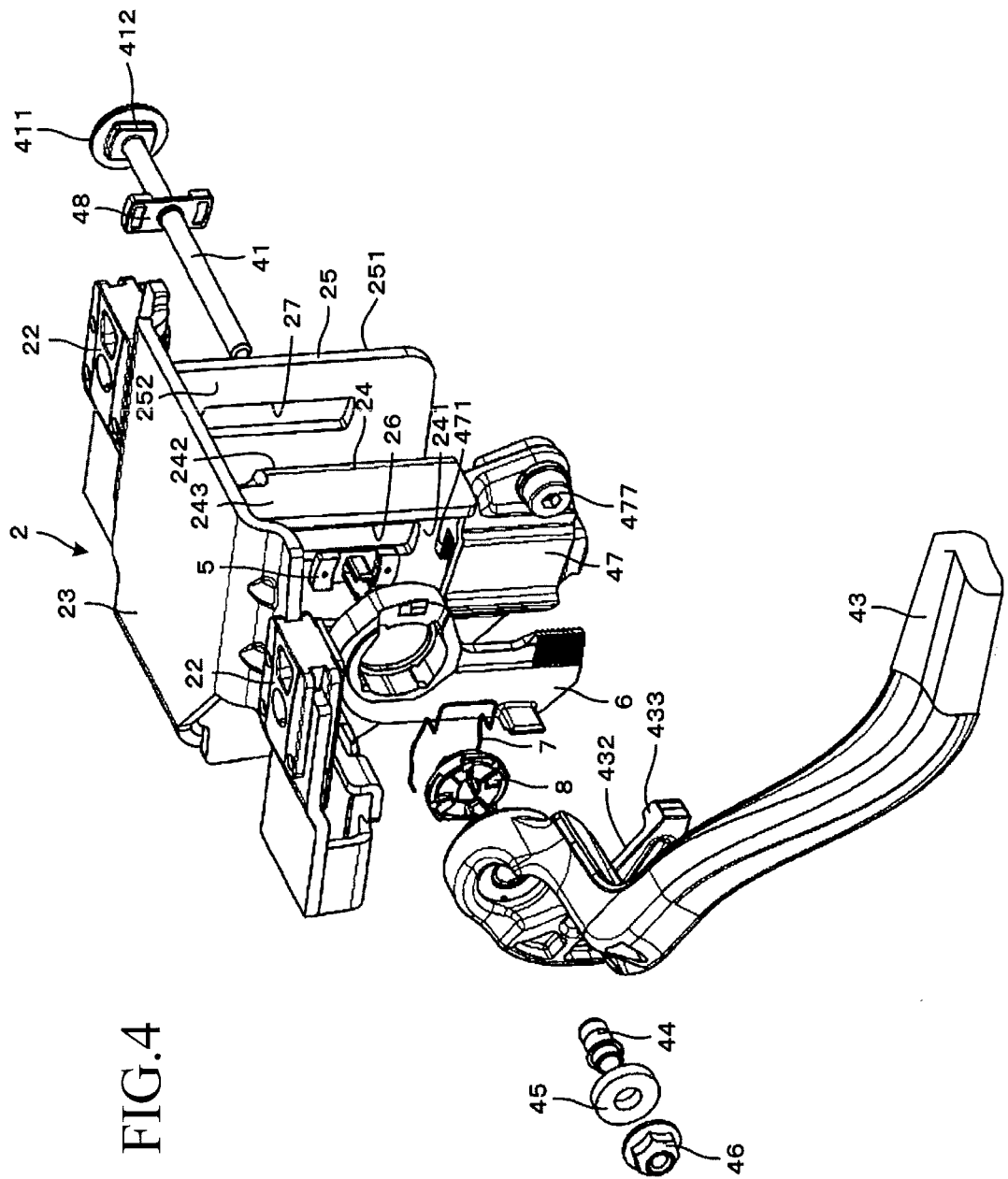
FIG. 4 is an exploded perspective view showing a circumference of a bracket for installing on the vehicle body when the bracket is viewed from the left upside of the rear side in the vehicle body.
Figure 5:
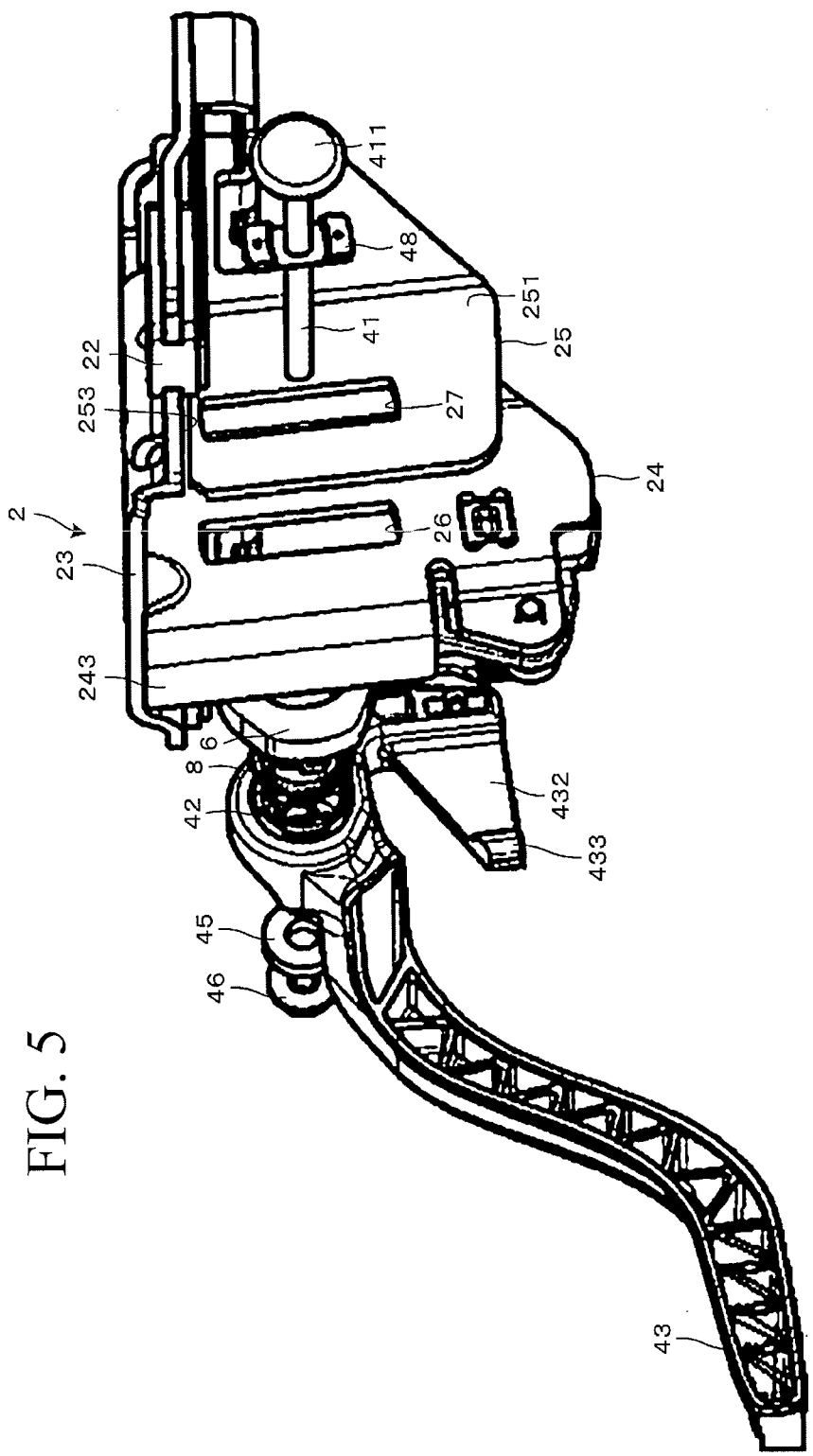
FIG. 5 is an exploded perspective view showing the circumference of the bracket for installing on the vehicle body when the bracket is viewed from the right downside of the rear side in the vehicle body.
Figure 6:
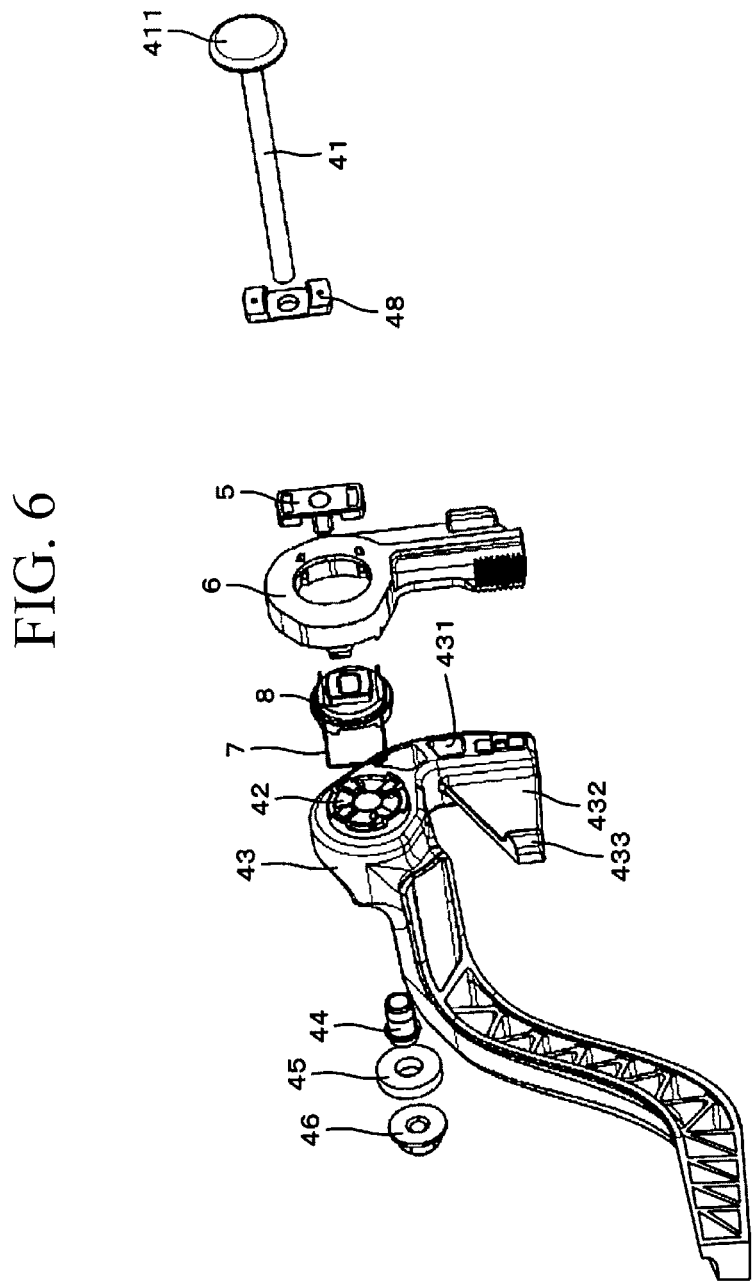
FIG. 6 is an exploded perspective view in which the bracket for installing on the vehicle body is omitted from FIG. 5.

FIG. 2 is a perspective view showing its main part when the steering device 101 in the embodiment of the present invention is viewed from the left upside of its rear in the vehicle body. FIG. 3 is a perspective view showing the main part when the steering device 101 in the embodiment of the present invention is viewed from the right downside of its rear in the vehicle body. FIG. 4 is an exploded perspective view when a circumference of a bracket for installing on the vehicle body is viewed from the left upside of the rear of the steering device in the vehicle body, FIG. 5 is an exploded perspective view when the circumference of the bracket for installing on the vehicle body is viewed from the right downside of the rear of the steering device in the vehicle body, and FIG. 6 is an exploded perspective view when the bracket for installing on the vehicle body is omitted from FIG. 5.

As shown in FIGS. 2 and 3, the steering device 101 in the embodiment of the present invention includes the bracket for installing on the vehicle body 2, an inner column (a lower column) 31, a steering assisting part 32 (an electrically operated assist mechanism), an outer column (an upper column) 34 and others.

A rear end in the vehicle body of the steering assisting part (the electrically operated assist mechanism) 32 is fixed on the front side in the vehicle body (on the left side in FIG. 2) of the inner column 31 by press fitting. The steering assisting part 32 includes an electric motor 321, a reduction gearbox 322, an output shaft 323 and others. In the steering assisting part 32, a bracket 33 integrated with a front end in the vehicle body of the steering assisting part 32 is supported by the vehicle body not shown so that a tilt position can be adjusted through a tilt central axis not shown.

An inside face of the outer column 34 is fitted onto an outside face of the inner column 31 so that a telescopic position can be adjusted (the inside face of the outer column can be slid in parallel with the central axis of the inner column 31). An upper steering shaft 102A is turnably supported inside the outer column 34 and the steering wheel 103 (see FIG. 1) is fixed to an end on the rear side in the vehicle body (on the right side in FIG. 2) of the upper steering shaft 102A. A slit (not shown) pierced from an outside face to the inside face of the outer column 34 is formed on the downside in the vehicle body of the outer column 34. As for the slit, the side of a front end in the vehicle body of the outer column 34 is open and the side of a rear end in the vehicle body is closed.

A lower steering shaft not shown is turnably supported inside the inner column 31 and is fitted to the upper steering shaft 102A via splines. Accordingly, the rotation of the upper steering shaft 102A is transmitted to the lower steering shaft independent of the telescopic position of the outer column 34.

The steering assisting part 32 detects torque that acts upon the lower steering shaft, drives the electric motor 321, and rotates the output shaft 323 with required steering auxiliary force. The rotation of the output shaft 323 is transmitted to the steering gear 107 via the universal joint 104, the intermediate shaft 105 and the universal joint 106 and the steering angle of the vehicle wheel can be shifted.

The bracket for installing on the vehicle body 2 that holds the outer column 34 from both right and left sides in a direction of vehicle width is attached on the front side in the vehicle body (on the left side in FIG. 2 and on the right side in FIG. 3) of the outer column 34. As shown in FIGS. 2 to 5, the bracket for installing on the vehicle body 2 is provided with a top plate 23 formed substantially horizontally in the direction of vehicle width and a pair of left and right side plates 24, 25 extended downward in the vehicle body from the top plate 23 and holding the outer column 34 from both right and left sides in the direction of vehicle width.

A notch not shown (its rear side in the vehicle body is open) is formed on both right and left sides in the direction of vehicle width of the top plate 23 and the top plate 23 is attached to the vehicle body via capsules 22 fitted into each notch.

When a driver collides with the steering wheel 103 in secondary collision and great impact force acts upon the bracket for installing the vehicle body 2 and the outer column 34, the bracket for installing on the vehicle body 2 is separated from the capsule 22 on the front side in the vehicle body, is guided to the inner column 31, collapses on the front side in the vehicle body, and absorbs striking energy in the collision.

A pair of clamping members not shown and protruded outside the outer column 34 in the direction of vehicle width are integrated with the front side in the vehicle body of the outer column 34. A long groove for telescopic adjustment not shown and extended long in an axial direction of the outer column 34 is formed on the clamping member. Besides, each long groove 26, 27 for tilt adjustment is formed on each side plate 24, of the bracket for installing on the vehicle body 2. The long grooves for tilt adjustment 26, 27 are formed in the shape of a circular arc with the tilt central axis in the center. The outside face of each clamping member of the outer column 34 is slidably touched to each inside face 242, 252 of the side plates 24, 25 of the bracket for installing on the vehicle body 2.

A round clamping rod 41 is inserted from the right side in FIGS. 4 and 6 through the long grooves for tilt adjustment 26, 27 and the long grooves for telescopic adjustment. A tilt stopper 48 is fitted onto the clamping rod 41 and a left end of the clamping rod 41 is made to pass the right long groove for tilt adjustment 27, the right long groove for telescopic adjustment, the left long groove for telescopic adjustment and the left long groove 26 for tilt adjustment. Next, a tilt stopper 5, a movable tilt lock gear 6, a wire spring (a spring) 7, a fixed cam 8, a movable cam 42, an operating lever 43, a collar 44 and a thrust bearing 45 are fitted on the side of the left end of the clamping rod 41 in order from the right, and a nut 46 is clamped and fixed to the left end of the clamping rod 41.

A rectangular detent 412 is formed on a disc-like head 411 at a right end of the clamping rod 41. The detent 412 is fitted into the right long groove for tilt adjustment 27 and a whirl of the clamping rod 41 for the side plate 25 is stopped. The right tilt stopper 48 is made of synthetic resin, has a long and substantially rectangular shape in a tilted direction, and is formed in width across flats having the substantially same dimension as the width of the long groove for tilt adjustment 27. Accordingly, the right tilt stopper 48 is fitted into the long groove for tilt adjustment 27, is smoothly slid in a tilt adjustment direction when the tilt position of the outer column 34 is adjusted, is touched to an end of the long groove for tilt adjustment 27, and lessens impact. The movable cam 42 is press-fitted into the operating lever 43 made of synthetic resin and is turned integrally with the operating lever 43.

Figure 7:
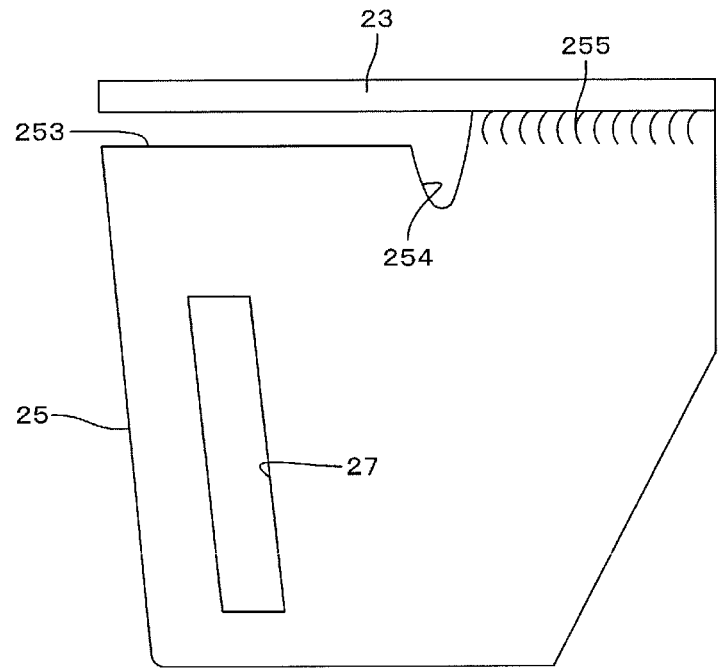
FIG. 7 is a front view showing a right side plate 25 of the bracket for installing on the vehicle body 2.
Figure 8:
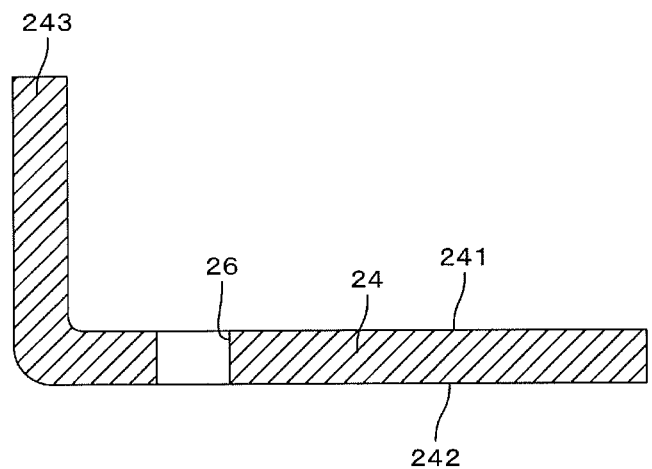
FIG. 8 is a cross-sectional view showing a left side plate 24 of the bracket for installing on the vehicle body 2.

FIG. 7 is a front view showing the right side plate 25 of the bracket for installing on the vehicle body 2, and FIG. 8 is a cross-sectional view showing the left side plate 24 of the bracket for installing on the vehicle body 2. As shown in FIGS. 4, 5 and 8, a rib 243 bent at a right angle toward the outside in the direction of vehicle width from the side plate 24 is formed at a rear end in the vehicle body of the left side plate 24. The rib 243 is formed along the long groove for tilt adjustment 26 in the vicinity of the long groove for tilt adjustment 26. An upper end in the vehicle body of the rib 243 is fixed to the top plate 23 of the bracket for installing on the vehicle body 2 by welding.

A lower end in the vehicle body of the rib 243 is formed to an upper end of a fixed tilt lock gear 47 described later, however, the lower end may be also extended to a lower end of the fixed tilt lock gear 47. Accordingly, the rigidity of the vicinity of the long groove for tilt adjustment 26 of the side plate 24 is increased by the rib 243 and when the operating lever 43 is turned to clamp the outer column 34 on the bracket for installing on the vehicle body 2, the elastic deformation of the side plate 24 is inhibited.

Figure 9:
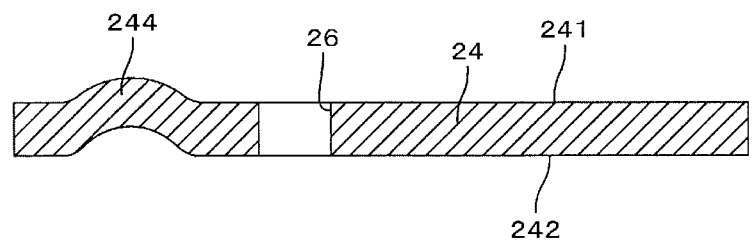
FIG. 9 is a cross-sectional view showing a transformed example of the left side plate 24 of the bracket for installing on the vehicle body 2.

FIG. 9 is a cross-sectional view showing a transformed example of the left side plate 24. As shown in FIG. 9, a rib 244 in the shape of a semicircular arc protruded toward the outside in the direction of vehicle width from the side plate 24 is formed on the rear side in the vehicle body (on the left side in FIG. 9) of the left side plate 24. The rib 244 is formed along the long groove for tilt adjustment 26 in the vicinity of the long groove for tilt adjustment 26. An upper end in the vehicle body of the rib 244 is fixed to the top plate 23 of the bracket for installing on the vehicle body 2 by welding. Accordingly, the rigidity of the vicinity of the long groove for tilt adjustment 26 of the side plate 24 is increased by the rib 244 and when the operating lever 43 is turned to clamp the outer column 34 on the bracket for installing on the vehicle body 2, the elastic deformation of the side plate 24 is inhibited.

Besides, as shown in FIGS. 3, 5 and 7, the front side in the vehicle body (the right side in FIG. 7) of an upper end in the vehicle body of the right side plate 25 is fixed to the top plate 23 of the bracket for installing on the vehicle body 2 by welding 255. Besides, clearance 253 is formed between the rear side and the top plate 23 of the bracket for installing on the vehicle body 2 on the rear side in the vehicle body (on the left side in FIG. 7) of the upper end in the vehicle body of the side plate 25, and the rear side in the vehicle body of the clearance 253 is open. Further, a notch 254 is formed at a front end in the vehicle body of the clearance 253. The notch 254 is provided to prevent welding distortion when the side plate 25 is fixed to the top plate 23 by the welding 255 from having an effect upon the vicinity of the long groove for tilt adjustment 27. Accordingly, the rigidity of the vicinity of the long groove for tilt adjustment 27 of the side plate 25 is reduced by the clearance 253 and the notch 254 and when the operating lever 43 is turned to clamp the outer column 34 on the bracket for installing on the vehicle body 2, the elastic deformation of the side plate 25 is facilitated.

Figure 10:
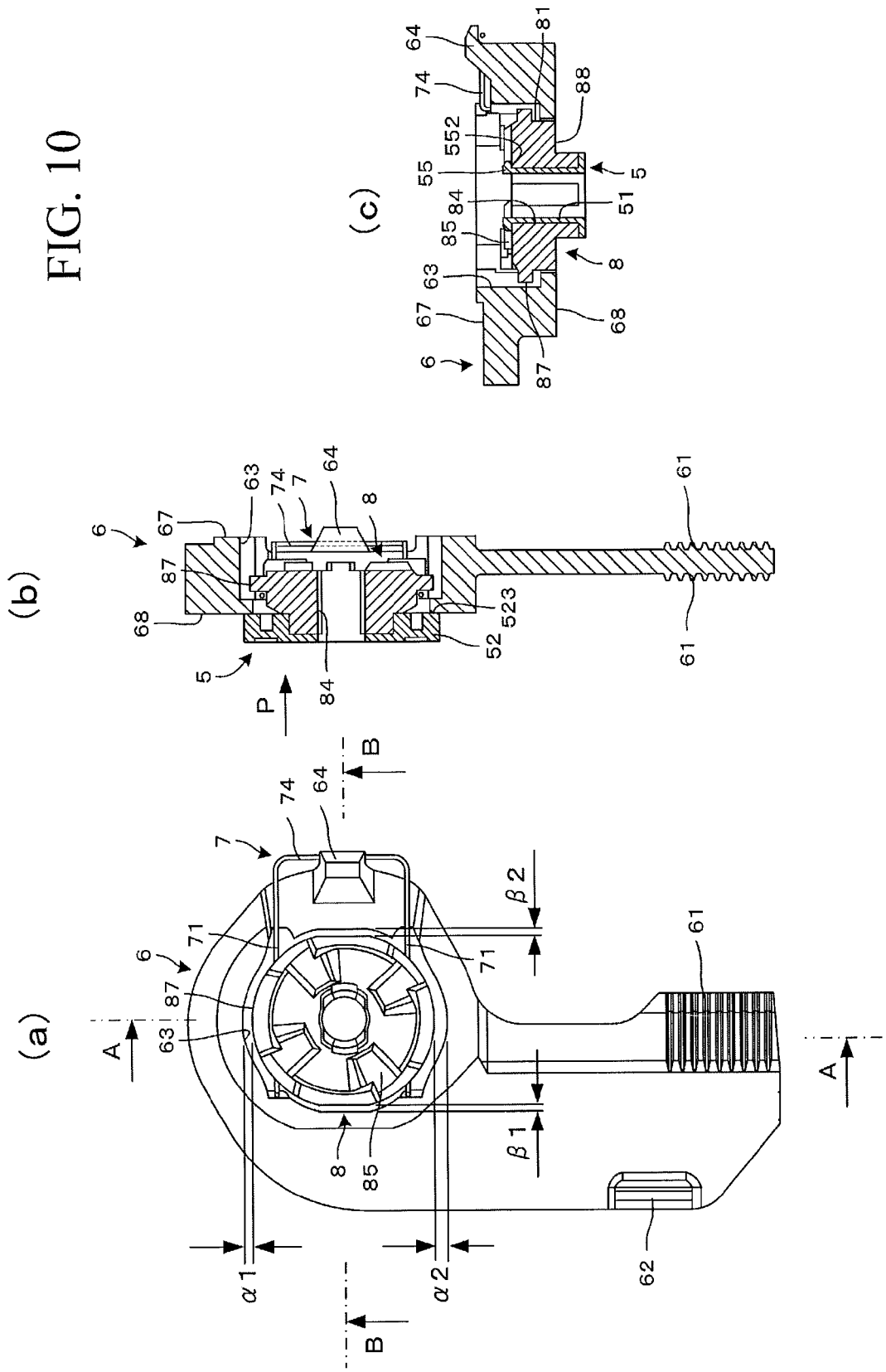
FIG. 10 show a state in which a movable tilt lock gear, a fixed cam and a wire spring are integrally assembled with a tilt stopper.
Figure 11:
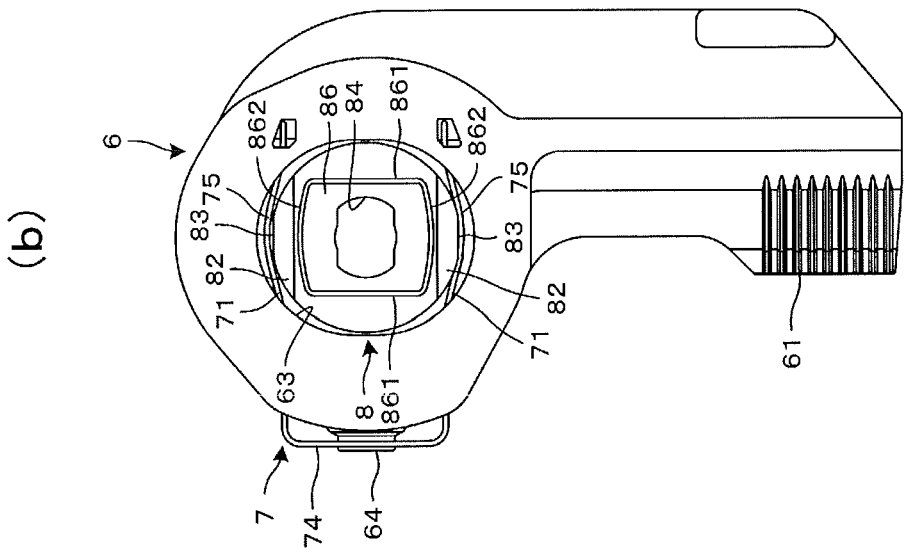
FIG. 11(a) is an arrow view viewed from a direction shown by an arrow P in FIG. 10(b) and FIG. 11(b) is a front view showing a state in which the tilt stopper is removed from FIG. 11(a)
Figure 11:
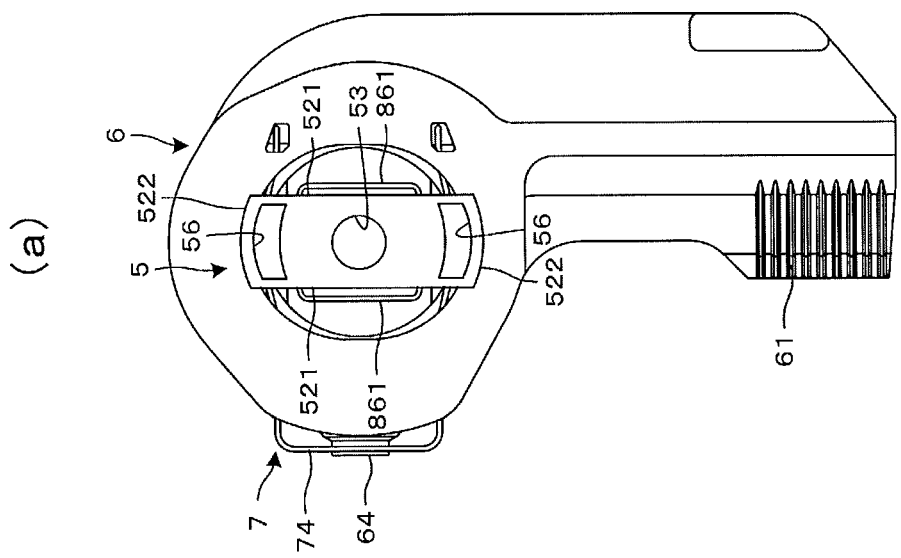

As the four parts of the tilt stopper 5, the movable tilt lock gear 6, the wire spring (the spring) 7 and the fixed cam 8 are integrally assembled and can be handled as one part, the efficiency of assembly is enhanced. That is, FIG. 10 show a state in which the movable tilt lock gear 6, the fixed cam 8 and the wire spring 7 are integrally assembled by the tilt stopper 5, FIG. 10(a) is a front view, FIG. 10(b) is a sectional view viewed along a line A-A in FIG. 10(a), and FIG. 10(c) is a sectional view viewed along a line B-B in FIG. 10(a). FIG. 11(a) is a view viewed from a direction shown by an arrow P in FIG. 10(b) and FIG. 11(b) is a front view showing a state in which the tilt stopper 5 is removed from FIG. 11(a).

Figure 12:
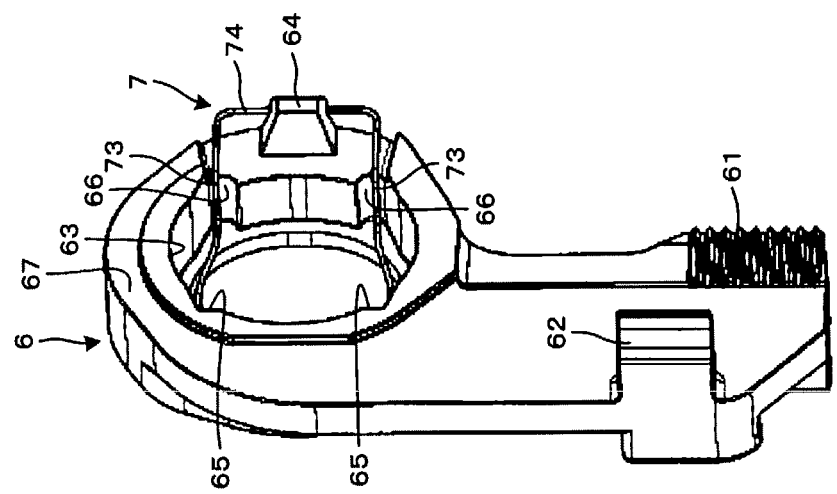
FIG. 12 are perspective views showing a state in which the fixed cam and the tilt stopper are removed from FIG. 10.
Figure 12:
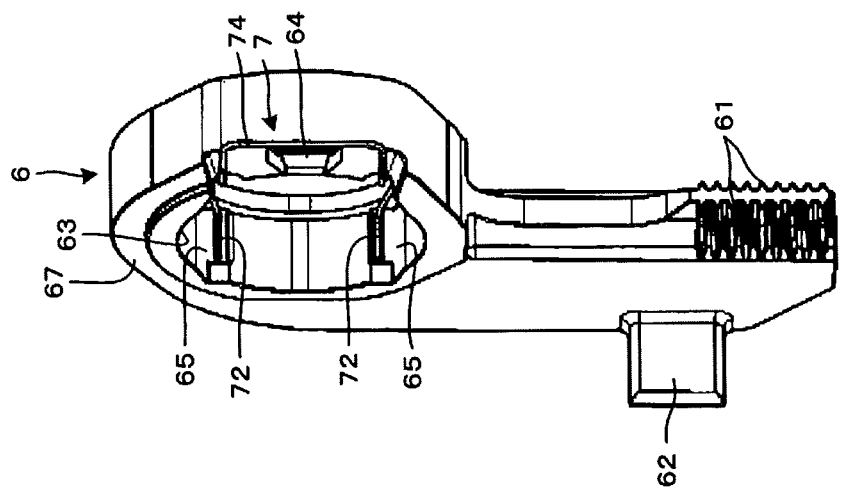
Figure 13:
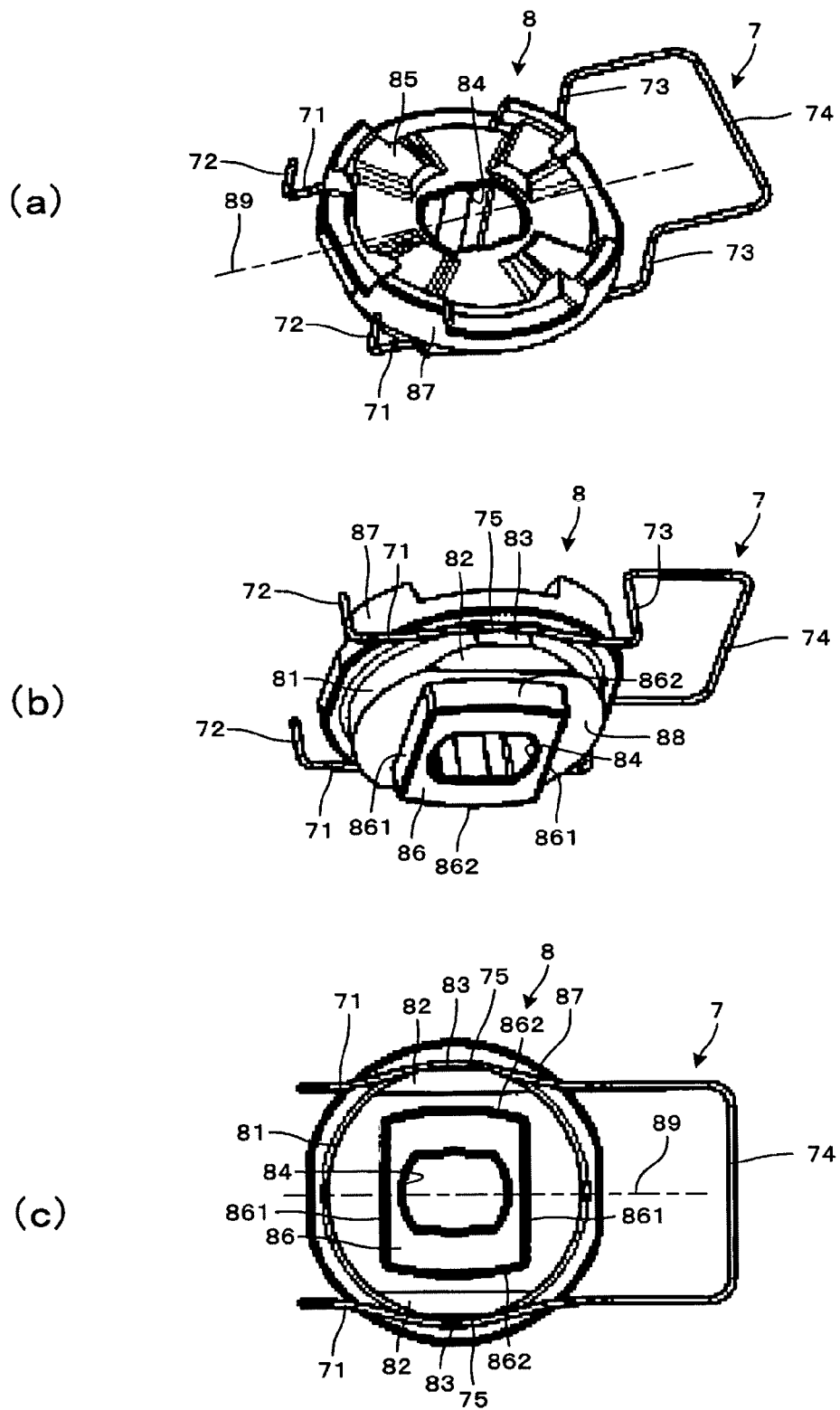
FIG. 13 show a state in which the fixed cam and the wire spring are connected.

FIG. 12 are perspective views showing a state in which the fixed cam 8 and the tilt stopper 5 are removed from FIG. 10, FIG. 12(a) is the perspective view when FIG. 10(a) is viewed from the diagonal right and FIG. 12(b) is the perspective view when FIG. 10(a) is viewed from the diagonal left. FIG. 13 show a state in which the fixed cam 8 and the wire spring 7 are fitted, FIG. 13(a) is a perspective view showing the fixed cam 8 when it is viewed from the side of an inclined cam face, FIG. 13(b) is a perspective view showing the fixed cam 8 when it is viewed from the side of a detent, and FIG. 13(c) is a front view showing the fixed cam 8 when it is viewed from the side of the detent.

The movable tilt lock gear 6 is formed with it elongated vertically in the vehicle body and a gear 61 is formed on both sides in the direction of vehicle width on the downside in the vehicle body of the movable tilt lock gear 6. The gear 61 is long in a lateral direction in FIG. 10(a), is tapered, and plural gears 61 are formed vertically in the vehicle body. Besides, as shown in FIGS. 2 and 4, the fixed tilt lock gear 47 is fixed to an outside face 241 of the left side plate 24 by a bolt 477. The fixed tilt lock gear 47 is bent to be U-shaped, the front side in the vehicle body is open, and plural gears 471 are formed vertically in the vehicle body on both insides in the direction of vehicle width.

A protrusion 62 is formed on an outside face in the direction of vehicle width of the movable tilt lock gear 6 and is fitted into a concave portion 431 (see FIG. 6) formed on the operating lever 43. Accordingly, the movable tilt lock gear 6 is turned in synchronization with the turning of the operating lever 43. When the operating lever 43 is turned counterclockwise to clamp the outer column 34 on the bracket for installing on the vehicle body 2, the movable tilt lock gear 6 is also turned counterclockwise, the gear 61 of the movable tilt lock gear 6 is engaged with the gear 471 of the fixed tilt lock gear 47, and holding power in the tilted direction is enhanced.

When the operating lever 43 is turned clockwise to unclamp the outer column 34 from the bracket for installing on the vehicle body 2, the movable tilt lock gear 6 is also turned clockwise and the gear 61 of the movable tilt lock gear 6 is separated from the gear 471 of the fixed tilt lock gear 47.

A through hole 63 parallel to the axis of the clamping rod 41 is formed on the upside in the vehicle body of the movable tilt lock gear 6 and the cylindrical fixed cam 8 is fitted into the through hole 63. The inside diameter of the through hole 63 is formed so that it is larger in a vertical direction in the vehicle body (in a vertical direction in FIG. 10(a)) and it is smaller in a longitudinal direction in the vehicle body (in a lateral direction in FIG. 10(a)). As a result, as for clearance between the major-diameter peripheral face (the peripheral face on the side of the inclined cam face 85) 87 of the fixed cam 8 and the through hole 63, clearance $\alpha 1$, $\alpha 2$ in the vertical direction in the vehicle body is made larger than clearance $\beta 1$, $\beta 2$ in the longitudinal direction in the vehicle body and the clearance is formed so that $\alpha 1 + \alpha 2 > \beta 1 + \beta 2$. The movable tilt lock gear 6 can move for the fixed cam 8 by the quantity of the clearance $\alpha 1$, $\alpha 2$, $\beta 1$, $\beta 2$.

Before the fixed cam 8 is fitted into the movable tilt lock gear 6, the wire spring 7 is attached to the movable tilt lock gear 6. As shown in FIG. 13, the wire spring 7 is formed by bending one wire and is configured by a pair of linear arm parts 71 mutually parallel, bent parts 72, 73 formed at both ends of the arm parts 71 and a U-shaped coupling part 74 that couples one bent parts 73.

The arm parts 71 and the bent parts 72, 73 of the wire spring 7 are inserted into the through hole 63 of the movable tilt lock gear 6 as shown in FIG. 12 and the coupling part 74 is hooked on a fitting protrusion 64 of the movable tilt lock gear 6. The fitting protrusion 64 is formed on an end face 67 on the side of the movable cam 42 of the movable tilt lock gear 6. Then, one bent parts 72 are fitted into fitting concave portions 65 formed in the through hole 63 and the other bent parts 73 are fitted into fitting concave portions 66. As a result, the movement in a plane parallel to a paper face of FIG. 10(a) of the wire spring 7 for the movable tilt lock gear 6 and the movement in a direction perpendicular to the paper face of FIG. 10(a) are hindered and in that state, the wire spring is attached to the movable tilt lock gear.

Next, the fixed cam 8 is fitted into the through hole 63 of the movable tilt lock gear 6. Then, the arm parts 71 of the wire spring 7 are elastically deformed using the bent parts 72, 73 for a fulcrum and the arm parts 71 grasp the cylindrical and minor-diameter peripheral face (the peripheral face on the side of a detent 86) 81 of the fixed cam 8. An inclined face 82 (see FIG. 13(b)) is formed on the peripheral face 81 of the fixed cam 8. The two inclined faces 82 opposite apart by 180 degrees are formed on the peripheral face 81 and when the fixed cam 8 is fitted into the through hole 63, the two inclined faces smoothly guide the peripheral face 81 of the fixed cam 8 between the arm parts 71.

Besides, a plane 83 (see FIG. 13(b)) is formed on the peripheral face 81 of the fixed cam 8. The two planes 83 are formed opposite apart by 180 degrees on the peripheral face 81 so as to facilitate matching a phase of the fixed cam 8 with the movable tilt lock gear 6 when the fixed cam 8 is fitted into the through hole 63. Besides, each portion in the shape of a circular arc 75 is formed in an intermediate position in a longitudinal direction of each arm 71. The radius of curvature of the portion in the shape of a circular arc 75 is made the same as that of the peripheral face 81 of the fixed cam 8. Accordingly, the center of the fixed cam 8 is held in the center of the through hole 63 of the movable tilt lock gear 6 by the pressure of the arm parts 71.

As shown in FIG. 13(a), the inclined cam face 85 fitted to an inclined cam face of the movable cam 42 is formed on one end face (an end face opposite to the movable cam 42 when the fixed cam 8 is attached to the clamping rod 41) of the fixed cam 8. Besides, as shown in FIGS. 13(b) and 13(c), the detent 86 is formed on the other end face (an end face opposite to the side plate 24 of the bracket for installing on the vehicle body 2 when the fixed cam 8 is attached to the clamping rod 41) of the fixed cam 8.

Planes 861 the width across flats of which is formed to be slightly narrower than the width of the long groove for tilt adjustment 26 are formed on the detent 86. Accordingly, the planes 861 are fitted into the long groove for tilt adjustment 26, and a whirl of the fixed cam 8 for the side plate 24 is stopped; at the same time, the fixed cam is guided to the long groove for tilt adjustment 26, and can be slid in the tilt adjustment direction. Besides, arc-shaped faces 862 are formed on end faces in the tilt adjustment direction (in a vertical direction in FIG. 13(c)) of the detent 86. As shown in FIGS. 13(a) and 13(c), as the fixed cam 8 is formed in a symmetrical shape having a straight line 89 passing the center of the fixed cam 8 as an axis of symmetry, the fixed cam is provided with structure that enables attachment even if it is attached reversely by 180 degrees. Though it is not shown, the movable cam 42 is also formed in a symmetrical shape having a straight line passing the center of the movable cam 42 as an axis of symmetry and is provided with structure that enables attachment even if the movable cam is attached reversely by 180 degrees.

Figure 14:
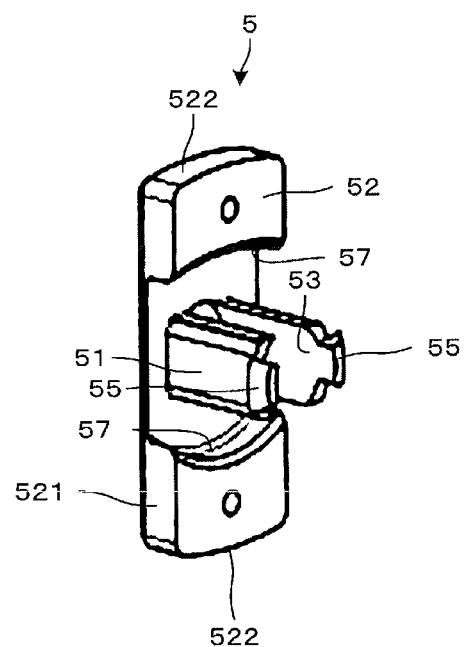
FIG. 14 are perspective views showing only the tilt stopper.
Figure 14:
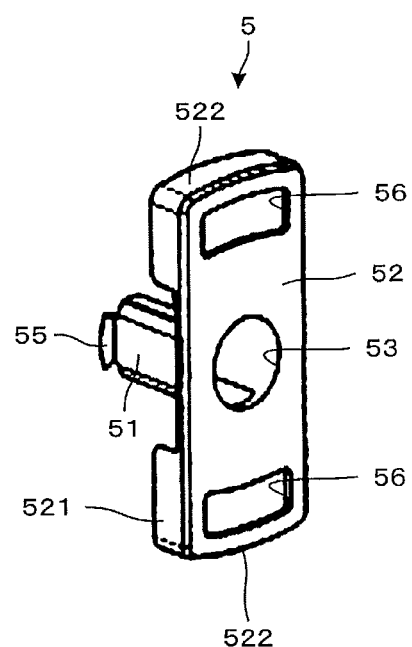
Figure 15:
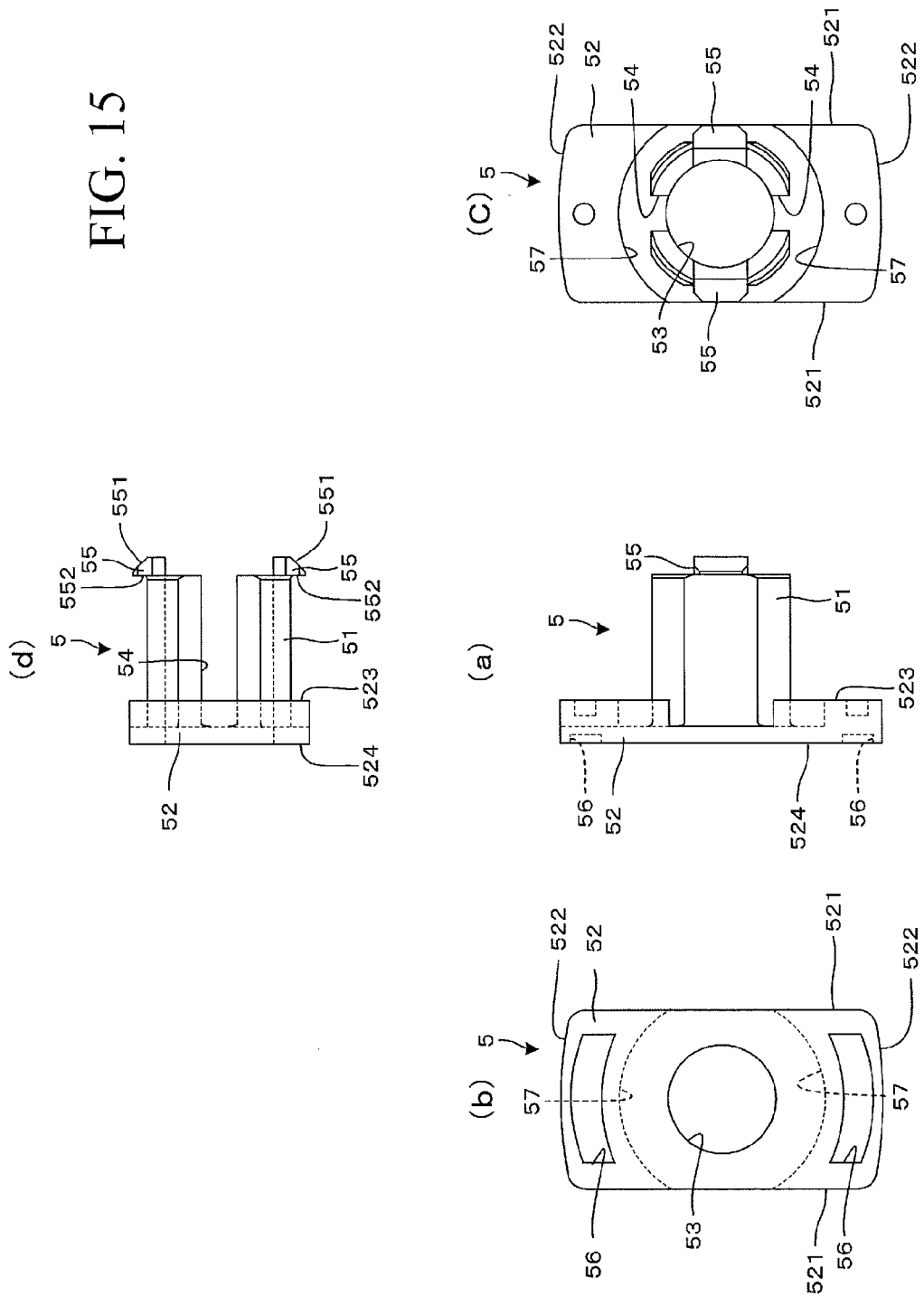
FIG. 15 are detail drawings showing only the tilt stopper.

Next, as shown in FIG. 10(b), the tilt stopper 5 is inserted into a through hole 84 formed in an axis of the fixed cam 8, and the four parts of the tilt stopper 5, the movable tilt lock gear 6, the wire spring 7 and the fixed cam 8 are integrally assembled. FIG. 14 are perspective views showing only the tilt stopper 5, FIG. 14(a) is the perspective view when the tilt stopper 5 is viewed from the side of a fitting protrusion, and FIG. 14(b) is the perspective view when the tilt stopper 5 is viewed from the side of a flange. FIG. 15 are detail drawings showing only the tilt stopper 5, FIG. 15(a) is a front view showing the tilt stopper 5, FIG. 15(b) is a left side view of FIG. 15(a), FIG. 15(c) is a right side view of FIG. 15(a), and FIG. 15(d) is a top view of FIG. 15(a).

As shown in FIGS. 14 and 15, the tilt stopper 5 is made of synthetic resin and is roughly configured by a hollow cylindrical part 51 and a rectangular thin flange part 52 integrated with one end (a left end in FIG. 15(a)) of the cylindrical part 51. A through hole 53 for inserting the clamping rod 41 is formed in the cylindrical part 51 and the flange part 52 and slits 54 that lead from a peripheral face of the cylindrical part 51 to the through hole 53 are formed.

Fitting protrusions 55 protruded outside in a radial direction from the peripheral face of the cylindrical part 51 are formed at the other end (a right end in FIG. 15(a)) of the cylindrical part 51. Each inclined face 551 is formed on each fitting protrusion 55 on the side of the other end of the cylindrical part 51 and fitting faces 552 perpendicular to the axis of the cylindrical part 51 are formed on the side of one end of the cylindrical part 51. The inclined face 551 is inclined in a direction in which the inclined face approaches the axis of the cylindrical part 51 on the side of the other end of the cylindrical part 51.

Planes 521 protruded outside from the peripheral face of the cylindrical part 51 and formed in width across flats slightly narrower than the width of the long groove for tilt adjustment 26 are formed on the flange part 52. Accordingly, the planes 521 of the flange part 52 are fitted into the long groove for tilt adjustment 26 and can be slid in the tilt adjustment direction. The width across flats of the planes 521 of the flange part 52 is formed to be slightly narrower than the width of across flats of the planes 861 of the fixed cam 8 (see FIG. 11(*a*)).

Besides, arc-shaped faces 522 are formed as end faces in the tilt adjustment direction (in a vertical direction in FIGS. 15(*b*), 15(*c*)) of the flange part 52. The arc-shaped faces 522 are formed as described above to lessen impulsive sounds when they are touched to ends of the long groove for tilt adjustment 26 at a tilt adjustment end. Further, on a left end face (at a left end in FIG. 15(*a*)) 524 of the flange part 52, grooves in the shape of a circular arc 56 are formed at ends in the tilt adjustment direction of the flange part 52 so as to facilitate the elastic deformation of the arc-shaped faces 522. Accordingly, when the arc-shaped face 522 are touched to the ends of the long groove for tilt adjustment 26 at the ends at which the tilt is adjusted, the arc-shaped faces 522 are elastically deformed and impact at the ends at which the tilt is adjusted can be lessened.

Besides, concave portions in the shape of a circular arc 57 are formed on a right end face (at a right end in FIG. 15(*a*)) 523 of the flange part 52. A radius of the curvature of the concave portions in the shape of a circular arc 57 is formed to be slightly larger than that of the arc-shaped faces 862 of the fixed cam 8.

As shown in FIGS. 10(*b*) and 10(*c*), the cylindrical part 51 of the tilt stopper 5 is inserted into the through hole 84 formed in the axis of the fixed cam 8. Then, as the inclined face 551 of the fitting protrusion 55 of the tilt stopper 5 is touched to the through hole 84 and the cylindrical part 51 is contracted in its diameter, the cylindrical part 51 can be smoothly inserted into the through hole 84.

When the insertion of the cylindrical part 51 of the tilt stopper 5 into the through hole 84 is finished, the contracted diameter of the cylindrical part 51 is widened and the fitting face 552 of the fitting protrusion 55 is fitted to the end face on the side of the inclined cam face 85 of the fixed cam 8. Besides, the concave portions in the shape of a circular arc 57 of the tilt stopper 5 are fitted to the arc-shaped faces 862 of the fixed cam 8. Further, the right end face 523 (see FIG. 10(*b*)) of the flange part 52 of the tilt stopper 5 is touched to an end face (on the side of the side plate 24) 68 of the movable tilt lock gear 6.

Accordingly, as the movable tilt lock gear 6, the wire spring 7 and the fixed cam 8 are integrated by the tilt stopper 5 and the four parts can be prevented from being disassembled on the way of transportation when the assembly is completed, time required for assembly can be reduced. Besides, as the four parts are axially aligned, the wire spring 7 and the fixed cam 8 can be held in axial fixed positions. As a result, the center of the through hole 63 of the movable tilt lock gear 6 can be stably held in the center of the fixed cam 8 by the elasticity of the wire spring 7.

The planes 861 of the detent 86 of the fixed cam 8 are fitted into the long groove for tilt adjustment 26 of the side plate 24 of the bracket for installing on the vehicle body 2 with the assembly configured by the four parts of the tilt stopper 5, the movable tilt lock gear 6, the wire spring 7 and the fixed cam 8 the assembly of which is completed as described above in a hand.

Next, the round clamping rod 41 onto which the tilt stopper 48 is fitted is inserted into the long groove for tilt adjustment 27, the right long groove for telescopic adjustment, the left long groove for telescopic adjustment and the long groove for tilt adjustment 26. Next, the left end of the clamping rod 41 is inserted into the through hole 53 of the tilt stopper 5 in the assembly configured by the four parts. Afterward, when the movable cam 42, the operating lever 43, the collar 44 and the thrust bearing 45 are fitted to the left end of the clamping rod 41 and the nut 46 is fastened and fixed to the left end of the clamping rod 41, the assembly of the tilt clamping mechanism is completed.

To clamp the outer column 34 on the bracket for installing on the vehicle body 2, the operating lever 43 is turned counterclockwise. Then, as the planes 861 of the detent 86 of the fixed cam 8 are fitted into the long groove for tilt adjustment 26 and the whirl of the fixed cam 8 is regulated, the fixed cam 8 is not whirled and a crest of the inclined cam face of the movable cam 42 hits onto a crest of the inclined cam face 85 of the fixed cam 8. Therefore, the end face (see FIG. 10(*c*) and FIG. 13(*b*)) 88 on the side of the detent 86 of the fixed cam 8 presses the outside face 241 of the left side plate 24 inside. As described above, as the rigidity of the vicinity of the long groove for tilt adjustment 26 of the left side plate 24 is increased by the rib 243, the elastic deformation is inhibited.

When the crest of the inclined cam face of the movable cam 42 hits onto the crest of the inclined cam face 85 of the fixed cam 8, the clamping rod 41 is pulled on the left side in FIG. 4 and the disc-like head 411 presses the outside 251 of the right side plate 25 inside. As described above, as the rigidity of the vicinity of the long groove for tilt adjustment 27 of the right side plate 25 is decreased by the clearance 253 and the notch 254, the right side plate 25 is greatly elastically deformed inside and the inside face 252 of the right side plate 25 strongly presses the outside face of the right clamping member of the outer column 34. As a result, the inside face 242 of the left side plate 24 and the inside face 252 of the right side plate 25 strongly grasp the outsides of the right and left clamping members of the outer column 34.

As described above, the right and left clamping members of the outer column 34 are clamped on the bracket for installing on the vehicle body 2 with large holding power in a predetermined tilt adjustment position and the tilt can be clamped. As the tilt clamping mechanism according to the present invention directly clamps the side plates 24, 25 without using an elastic member, it can increase rigidity when the tilt is clamped. The clamping member is elastically deformed inside in a direction in which inside faces of the clamping members mutually approach and the width of the slit of the outer column 34 is narrowed. Accordingly, a diameter of the inside face of the outer column 34 is narrowed, the outside face of the inner column 31 is clamped, and a telescopic clamping is performed.

When the operating lever 43 is turned counterclockwise, the movable tilt lock gear 6 is also turned counterclockwise in synchronization with the turning of the operating lever 43. The fixed cam 8 is not turned because the planes 861 of the detent 86 of the fixed cam 8 are fitted into the long groove for tilt adjustment 26 and the turning is regulated, and the movable tilt lock gear 6 and the wire spring 7 are turned counterclockwise together.

As the arm parts 71 of the wire spring 7 are slid with the arm parts touched to the cylindrical peripheral face 81 of the fixed cam 8, the center of the through hole 63 of the movable tilt lock gear 6 is held in the center of the fixed cam 8 by the pressure of the wire spring 7. As no clamping force is applied to the wire spring 7 and the arm parts 71 of the wire spring 7 are only slid with the arm parts touched to the peripheral face 81 of the fixed cam 8 with fixed surface pressure even if the outer column 34 is clamped on the bracket for installing on the vehicle body 2, the durability of the wire spring 7 and the fixed cam 8 is safe from deterioration.

When positions in a vertical direction of the vehicle body of the movable tilt lock gear 6 and the fixed tilt lock gear 47 are not matched and threads of the gear 61 of the movable tilt lock gear 6 and the gear 471 of the fixed tilt lock gear 47 are touched, the arm parts 71 of the wire spring 7 are elastically deformed by the quantity of the clearance $\alpha 1$, $\alpha 2$ by reaction force. As a result, the movable tilt lock gear 6 is slightly moved in the vertical direction of the vehicle body with the fixed cam 8 fixed, and the gear 61 of the movable tilt lock gear 6 and the gear 471 of the fixed tilt lock gear 47 are normally engaged. Accordingly, even if a driver violently collides with the steering wheel in secondary collision, the column is not moved in the tilted direction and an air bag provided to the steering wheel can receive occupants in an effective position.

The gear 61 is formed at the end of the movable tilt lock gear 6 turned with the clamping rod 41 in the center and distance from the center of the clamping rod 41 to the gear 61 is separated. Distance from the long groove for tilt adjustment 26 to the fixed tilt lock gear 47 is also separated. The movable tilt lock gear 6 is integrally molded and the elastic deformation of the left side plate 24 to which the fixed tilt lock gear 47 is attached is inhibited by the rib 243. Accordingly, as relative positions in the direction of vehicle width of the fixed tilt lock gear 47 and the movable tilt lock gear 6 do not vary in clamping the tilt and telescopic clamping, the movable tilt lock gear 6 and the fixed tilt lock gear 47 are smoothly engaged.

When the driver collides with the steering wheel 103 in secondary collision and large impact force acts, the fixed tilt lock gear 47 transmits the impact force to the vehicle body via the side plate 24, the top plate 23 and the capsule 22 and receives the impact force. Besides, the deformation of the side plate 24 is inhibited by forming the rib 243 on the side plate 24 because the fixed tilt lock gear 47 is attached in a position apart from the top plate 23 and the movable tilt lock gear 6 is prevented from being loosened, compared with the fixed tilt lock gear 47.

The clearance 253 of the other side plate 25 is formed in a connection of the other side plate 25 and the top plate 23, the rear side in the vehicle body is open, and the long groove for tilt adjustment 27 is formed on the downside of the clearance 253. Accordingly, as the side plate 25 is easily deformed when the disc-like head 411 of the clamping rod 41 presses the side plate 25 in clamping the tilt and telescopic clamping, the outer column 34 can be smoothly clamped.

Besides, the clearance 253 formed in the connection of the top plate 23 and the side plate 25 is open on the rear side in the vehicle body. Accordingly, when excessive impact force is applied, the clearance 253 is narrowed, the side plate 25 is touched to the top plate 23, and the side plate 25 is smoothly deformed upward.

When the gear 61 of the movable tilt lock gear 6 and the gear 471 of the fixed tilt lock gear 47 are normally engaged, the arm parts 71 of the wire spring 7 are moved from the cylindrical peripheral face 81 of the fixed cam 8 to the planes 83. As a result, as the arm parts 71 press the movable tilt lock gear 6 in a direction in which the movable tilt lock gear is turned counterclockwise, the operating lever 43 is also pressed in the direction in which the operating lever is turned counterclockwise and the effect of the detent of the operating lever 43 is produced.

When the operating lever 43 is turned clockwise to unclamp the outer column 34 from the bracket for installing the vehicle body 2, the movable tilt lock gear 6 is also turned clockwise and the engagement of the gear 61 of the movable tilt lock gear 6 and the gear 471 of the fixed tilt lock gear 47 is disengaged. Besides, a crest of the inclined cam face 85 of the fixed cam 8 and a trough of the inclined cam face of the movable cam 42 are engaged. Then, positions of the fixed cam 8 and the movable cam 42 relatively approach axially and the side plate 25 of the bracket for installing on the vehicle body 2 is elastically restored in a direction reverse to a direction of grasping.

Hereby, the outer column 34 is turned free from the side plates 24, 25 of the bracket for installing on the vehicle body 2 (the tilt is turned unclamped). Besides, the clamping member of the outer column 34 is elastically restored outside in a direction in which the inside faces of the clamping members are mutually separated and the width of the slit of the outer column 34 is widened. Accordingly, the diameter of the inside face of the outer column 34 is widened, the outside face of the inner column 31 is loosened, and the outer column and the inner column are telescopically unclamped.

In a state in which the tilt is unclamped and the columns are telescopically unclamped, the arm parts 71 of the wire spring 7 are moved from the planes 83 of the fixed cam 8 to the cylindrical peripheral face 81. As a result, the movable tilt lock gear 6 is slightly moved in the vertical direction of the vehicle body because of the clearance $\alpha 1$, $\alpha 2$ and the pressure of the wire spring 7, the engagement of the movable tilt lock gear 6 and the fixed tilt lock gear 47 is easily disengaged, and afterward, when the unclamping of the tilt and the telescopic unclamping advance, the center of the through hole 63 of the movable tilt lock gear 6 is restored to the center of the fixed cam 8.

In a state in which the tilt is unclamped and the columns are telescopically unclamped, the outer column 34 is displaced in the tilted direction, guiding the tilt stopper 48, the tilt stopper 5 and the detent 86 of the fixed cam 8 to the long grooves for tilt adjustment 26, 27 of the bracket for installing on the vehicle body 2 and the tilted direction of the steering wheel 103 can be arbitrarily adjusted. When the arc-shaped faces 522 of the tilt stopper 5 are touched to the ends of the long groove for tilt adjustment 26 at the tilt adjustment end, the arc-shaped faces 522 are elastically deformed and impact at the tilt adjustment end can be lessened.

Besides, the outer column 34 is displaced along the outside face of the inner column 31 in a telescopic direction, guiding the long groove for telescopic adjustment of the outer column 34 to the clamping rod 41 and the adjustment in the telescopic direction of the steering wheel 103 can be arbitrarily performed.

Figure 16:
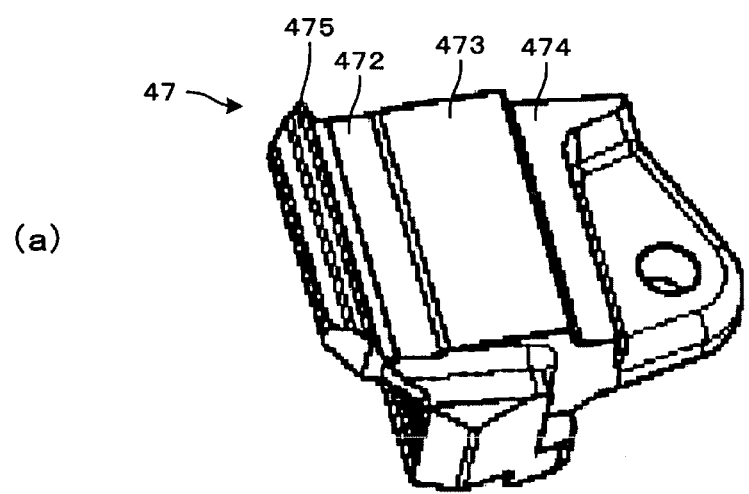
FIG. 16 are perspective views showing only a fixed tilt lock gear.
Figure 16:
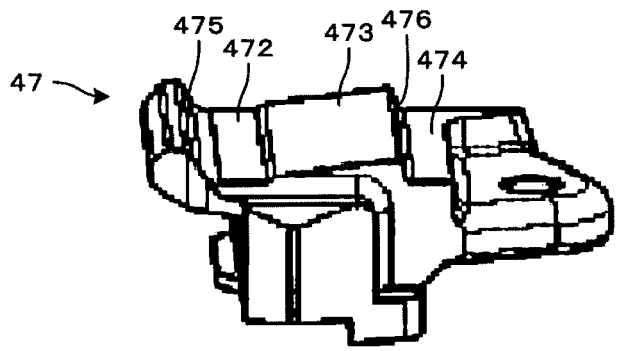
Figure 17:
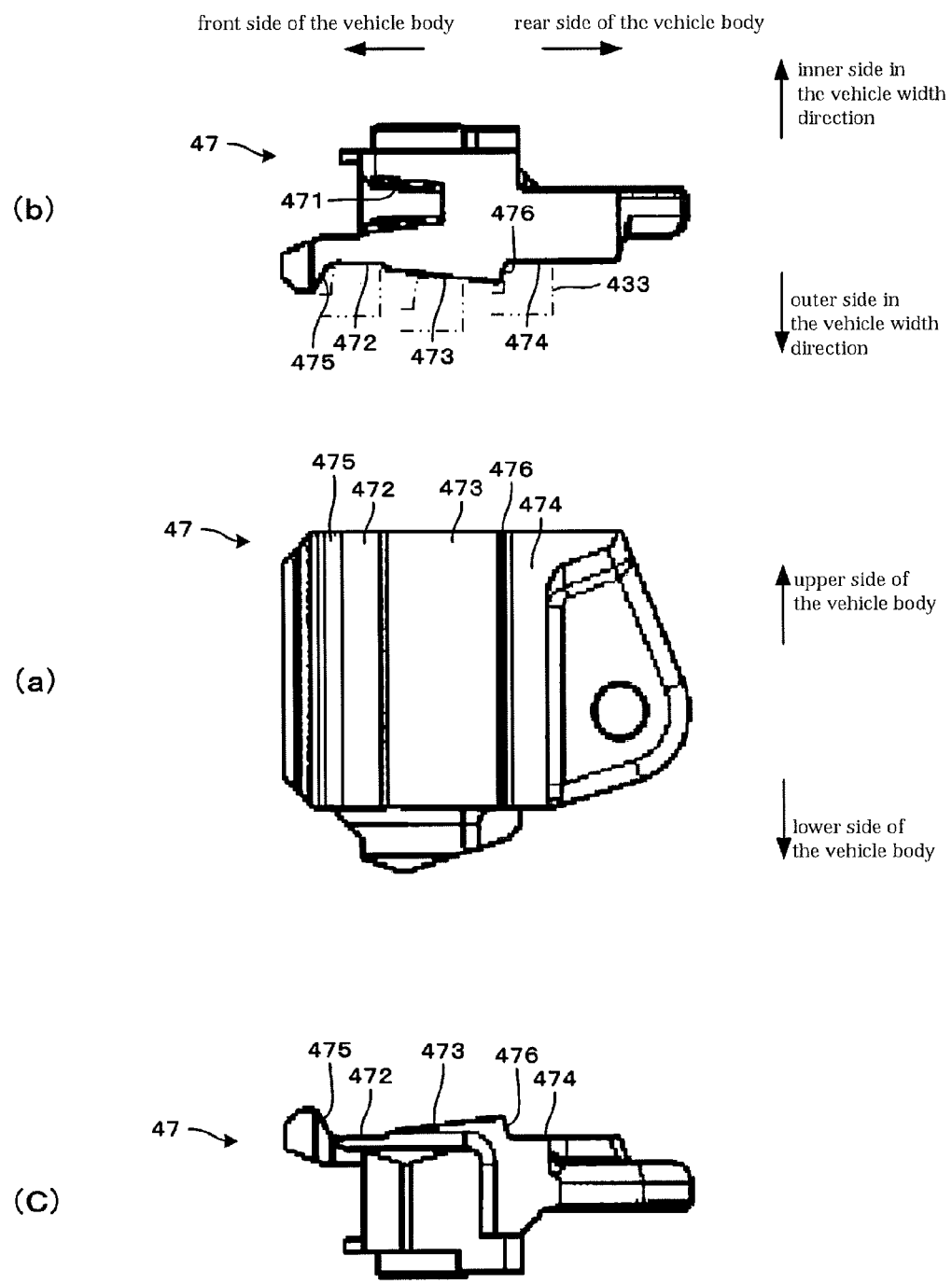
FIG. 17 are detail drawings showing only the fixed tilt lock gear.

FIG. 16 are perspective views showing only the fixed tilt lock gear 47, FIG. 16(a) is the perspective view when the fixed tilt lock gear 47 is viewed from the diagonal downside outside in the direction of vehicle width, and FIG. 16(b) is the perspective view when the fixed tilt lock gear is viewed from the further downside than the downside in FIG. 16(a). FIG. 17 are detail drawings showing only the fixed tilt lock gear 47, FIG. 17(a) is a front view showing the fixed tilt lock gear 47, FIG. 17(b) is a top view of FIG. 17(a), and FIG. 17(c) is a bottom view of FIG. 17(a).

Figure 18:
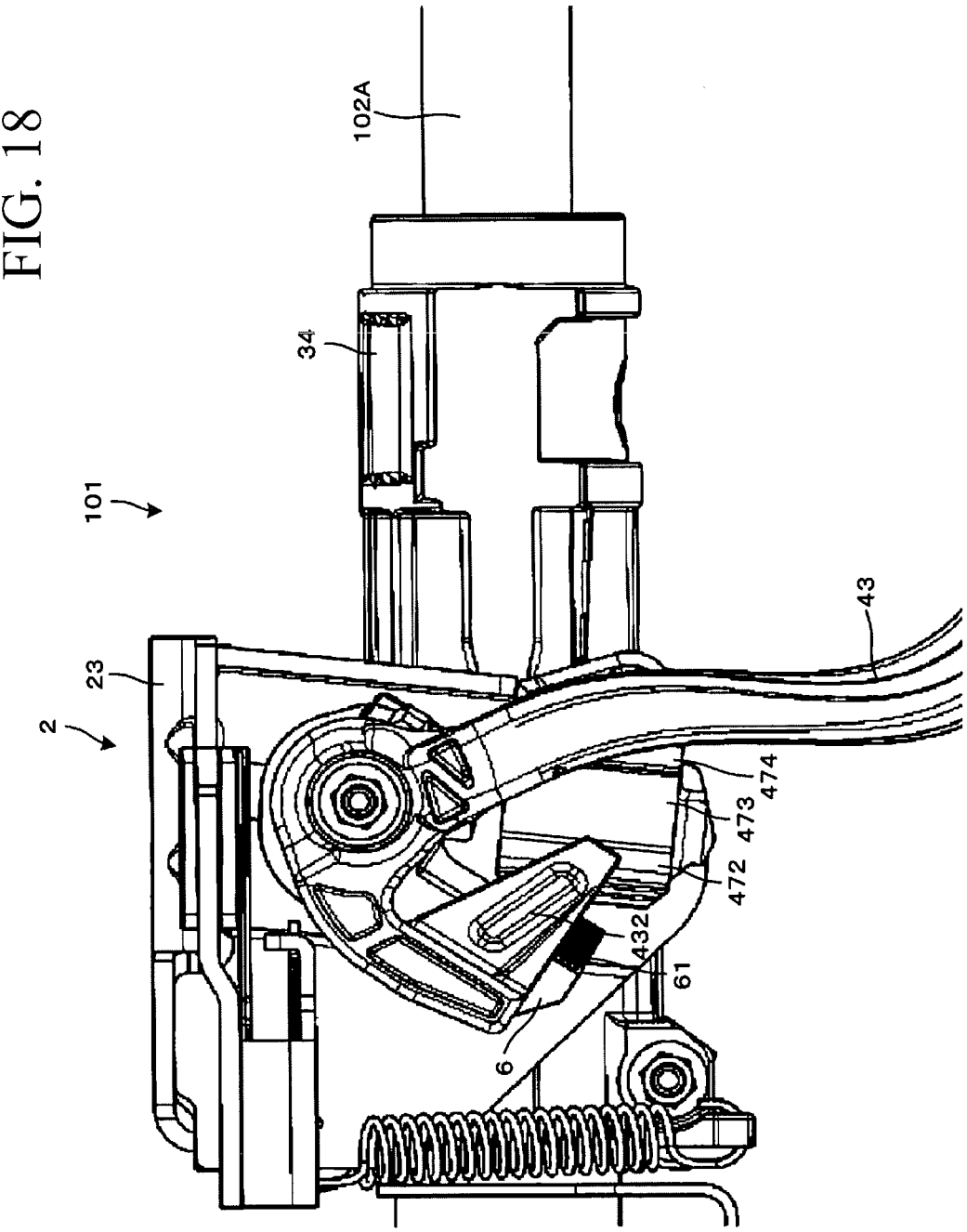
FIG. 18 is a front view showing the vicinity of an operating lever when the operating lever is turned clockwise and an outer column is unclamped from the bracket for installing on the vehicle body.
Figure 19:
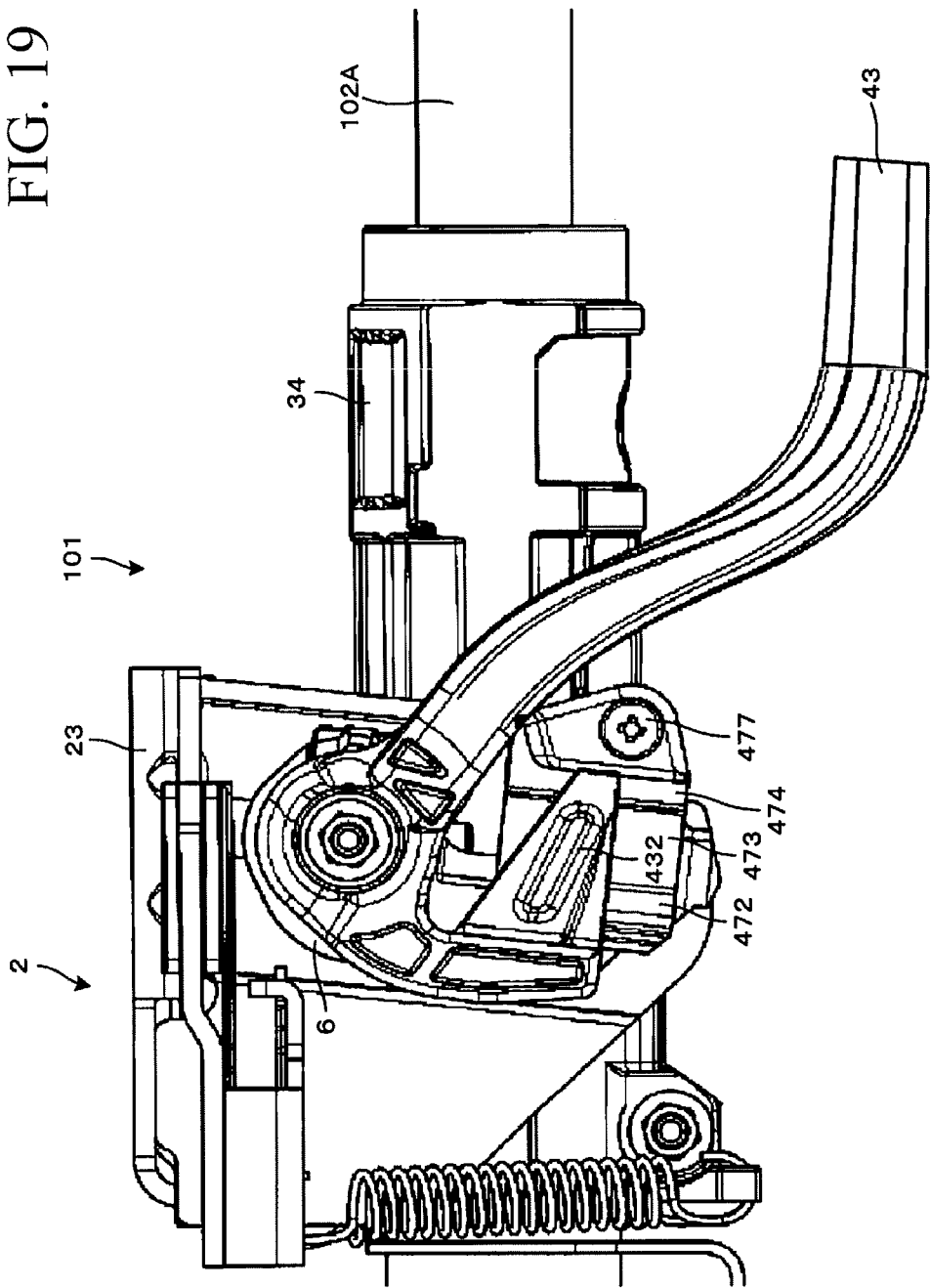
FIG. 19 is a front view showing the vicinity of the operating lever when the operating lever is turned counterclockwise and the outer column is clamped on the bracket for installing on the vehicle body.
Figure 20:
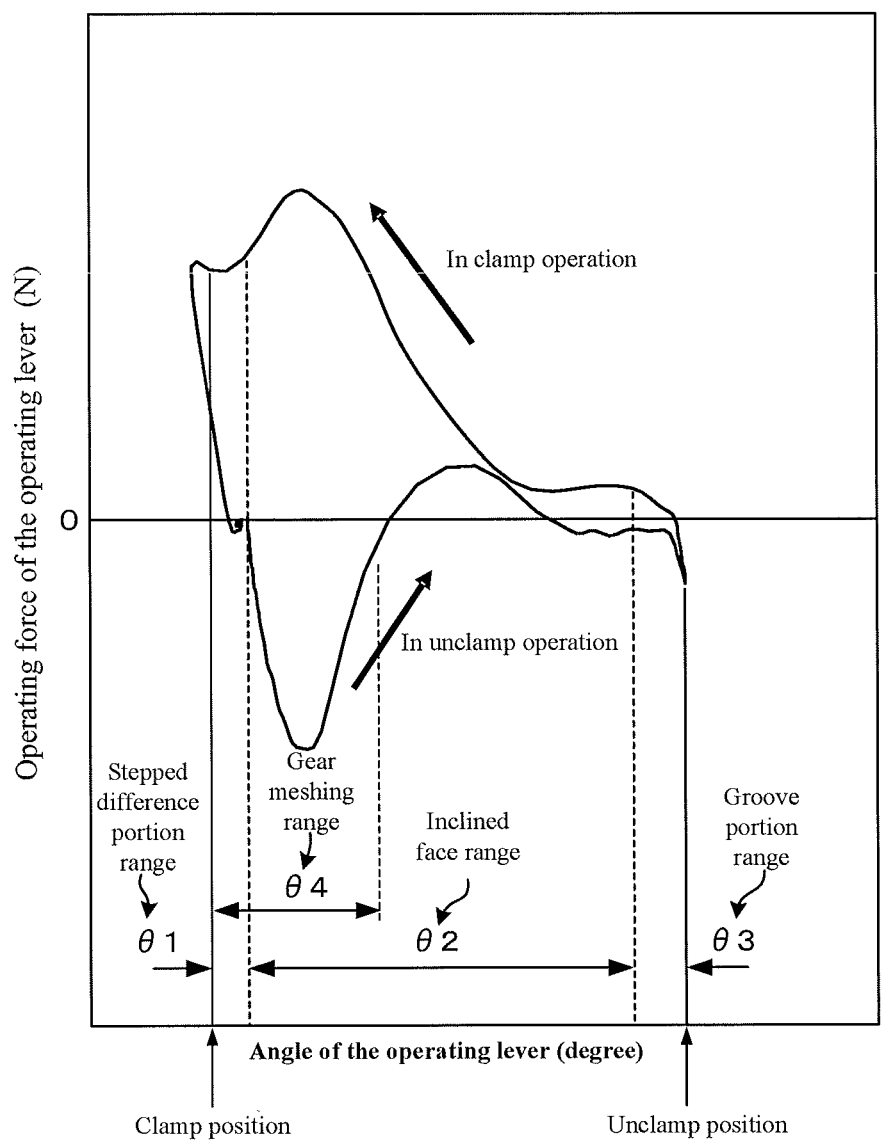
FIG. 20 is a graph showing relation between a turning angle of the operating lever and control force required to operate the operating lever.

FIG. 18 is a front view showing the vicinity of the operating lever 43 in a state in which the operating lever 43 is turned clockwise and the outer column 34 is unclamped from the bracket for installing on the vehicle body 2. FIG. 19 is a front view showing the vicinity of the operating lever 43 in a state in which the operating lever 43 is turned counterclockwise and the outer column 34 is clamped on the bracket for installing on the vehicle body 2. FIG. 20 is a graph showing relation between a turning angle of the operating lever 43 and control force required to operate the operating lever 43.

As shown in FIGS. 4 and 6, a fitting protrusion 433 is formed at an end of a thin elastically deformed part 432 in the operating lever 43 made of synthetic resin. The fitting protrusion 433 is protruded toward the outside face 241 of the side plate 24. As shown in FIGS. 16 and 17, a sliding surface configured by a groove 472, an inclined face 473 and a stepped part 474 is formed on the outside face of the fixed tilt lock gear 47. The elastically deformed part 432 is elastically deformed, the fitting protrusion 433 is constantly touched to the sliding surface configured by the groove 472, the inclined face 473 and the stepped part 474 and is slid on it, and the fitting protrusion normally presses the operating lever 43 outside in the direction of vehicle width. Accordingly, the looseness of the operating lever 43 is removed and the operability of the operating lever 43 is enhanced.

The length (the length in a vertical direction in FIG. 17(*a*)) in the vertical direction of the vehicle body of the groove 472, the inclined face 473 and the stepped part 474 is formed to be slightly longer than the length for tilt adjustment of the outer column 34. The groove 472 is made concave inside a front end {a left end in FIG. 17(*b*)} in the vehicle body of the inclined face 473 in the direction of vehicle width {on the upside in FIG. 17(*b*)} and the groove is parallel to the outside face 241 of the side plate 24. The length in the longitudinal direction in the vehicle body {the lateral length in FIG. 17(*b*)} of the groove is formed to be slightly longer than the length in the longitudinal direction in the vehicle body of the fitting protrusion 433. A wall 474 that rises, forming an abrupt slope outside in the direction of vehicle width {on the downside in FIG. 17(*b*)} is formed at a front end in the vehicle body of the groove 472.

The inclined face 473 is formed to be higher with a gentle inclination outside in the direction of vehicle width toward the rear side in the vehicle body. An abrupt slope 476 that abruptly goes down inside in the direction of vehicle width (on the upside in FIG. 17(*b*)) and is connected to the stepped part 474 is formed at a rear end in the vehicle body of the inclined face 473. The stepped part 474 is parallel to the outside face 241 of the side plate 24 and the length in the longitudinal direction of the vehicle body (the lateral length in FIG. 17(*b*)) of the stepped part is formed to be slightly longer than the length in the longitudinal direction of the vehicle body of the fitting protrusion 433.

FIG. 18 is the front view showing the vicinity of the operating lever 43 in the state in which the outer column 34 is unclamped from the bracket for installing on the vehicle body 2. As shown in FIG. 18, in an unclamped position, the fitting protrusion 433 is fitted into the groove 472. The groove 472 is formed to be slightly longer than the length for tilt adjustment of the outer column 34 between the wall 475 and the front end in the vehicle body of the inclined face 473. Therefore, in the tilt adjustment of the outer column 34, the fitting protrusion 433 is guided and moved to the groove 472, and regulates the turning of the operating lever 43. Accordingly, in the adjustment of the tilt, the operating lever 43 does not rattle and gear noise caused by the unsatisfactory engagement of the movable tilt lock gear 6 and the fixed tilt lock gear 47 can be prevented.

When the operating lever 43 is turned counterclockwise to clamp the outer column 34 on the bracket for installing on the vehicle body 2, the fitting protrusion 433 is moved from the groove 472 to the inclined face 473 and is slid on the inclined face 473. As shown in FIG. 20, the control force of the operating lever 43 gradually increases. When the crest of the inclined cam face of the movable cam 42 hits on the crest of the inclined cam face 85 of the fixed cam 8, the control force of the operating lever 43 rapidly increases, the fitting protrusion 433 passes the abrupt slope 476, and the fitting protrusion is moved to the stepped part 474. FIG. 19 is the front view showing the vicinity of the operating lever 43 in the state in which the outer column 34 is clamped on the bracket for installing on the vehicle body 2.

As the crest of the inclined cam face of the movable cam 42 hits on the crest of the inclined cam face 85 of the fixed cam 8, the left side plate 24 and the right side plate 25 strongly grasp the outer column 34, simultaneously the movable tilt lock gear 6 is engaged with the fixed tilt lock gear 47, and clamping operation is completed. When the fitting protrusion 433 is fitted to the stepped part 474, the control force of the operating lever 43 rapidly decreases as shown in FIG. 20, a click and click stop feeling are made, and as definite operation feeling that clamping could be securely executed is left, the operation feeling is superior.

To turn the operating lever 43 from a clamping position to an unclamping position, the fitting protrusion 433 is required to hit on the abrupt slope 476. Therefore, as shown in FIG. 20, as great control force is required to be applied to the operating lever 43, unclamping operation can be prevented from being applied to the operating lever 43 by mistake.

When the operating lever 43 is turned clockwise to unclamp the outer column 34 from the bracket for installing on the vehicle body 2, the fitting protrusion 433 is moved to the inclined face 473 from the stepped part 474 through the abrupt slope 476 and is slid on the inclined face 473. As shown in FIG. 20, when the fitting protrusion 433 passes the abrupt slope 476, great control force is required, however, when the crest of the inclined cam face of the movable cam 42 is separated from the crest of the inclined cam face 85 of the fixed cam 8 and the fitting protrusion 433 is moved to the inclined face 473, the control force of the operating lever 43 rapidly decreases.

When the operating lever 43 is turned clockwise, the movable tilt lock gear 6 is also turned clockwise and the engagement of the movable tilt lock gear 6 and the fixed tilt lock gear 47 is disengaged. Besides, the crest of the inclined cam face 85 of the fixed cam 8 and the trough of the inclined cam face of the movable cam 42 are engaged and the outer column 34 is turned free from the side plates 24, 25 of the bracket for installing on the vehicle body 2 (the tilt is turned unclamped).

As shown in FIG. 20, pressure in a direction of unclamping (in a direction in which clamping is released) acts on the operating lever 43 by the contact of the fitting protrusion 433 and the inclined face 473. Accordingly, even if a hand is released from the operating lever 43 in an intermediate position of the clamping position and the unclamping position, the operating lever 43 is automatically moved in the unclamping position. Therefore, wrong operation that the operating lever 43 is halted in the intermediate position can be prevented, in the unsatisfactory engagement of the movable tilt lock gear 6 and the fixed tilt lock gear 47, gear noise caused in tilt position adjustment can be prevented, clamping is securely executed, and a tilt position can be smoothly adjusted in unclamping the tilt. As for an inclined direction of the inclined face 473, the inclined face may be also inclined in a direction in which pressure for clamping is applied to the operating lever 43.

As the fitting protrusion 433 is integrated with the operating lever 43 and the sliding surface configured by the groove 472, the inclined face 473 and the stepped part 474 is also formed as the outside face of the fixed tilt lock gear 47, the number of parts and man-hours for assembly can be reduced and the manufacturing cost can be reduced. The sliding surface configured by the groove 472, the inclined face 473 and the stepped part 474 may be also formed on the outside face 241 of the bracket for installing on the vehicle body 2.

In the above-mentioned embodiment, the case that the present invention is applied to the tilt telescopic type steering device in which both the adjustment of the tilt position and the adjustment of the telescopic position are enabled has been described, however, the present invention may be also applied to a tilt type steering device in which only the adjustment of the tilt position is enabled.

LIST OF REFERENCE SIGNS

101 Steering device
102 Steering shaft
102A Upper steering shaft
103 Steering wheel
104 Universal joint
105 Intermediate shaft
106 Universal joint
107 Steering gear
108 Tie rod
2 Bracket for installing on vehicle body
22 Capsule
23 Top plate
24 Side plate
241 Outside face
242 Inside face
243 Rib
244 Rib
25 Side plate
251 Outside face
252 Inside face
253 Clearance
254 Notch
255 Welding
26, 27 Long groove for tilt adjustment
31 Inner column
32 Steering assisting part
321 Electric motor
322 Reduction gearbox
323 Output shaft
33 Bracket
34 Outer column
41 Clamping rod
411 Disc-like head
412 Detent
42 Movable cam
43 Operating lever
431 Concave portion
432 Elastically deformed part
433 Fitting protrusion
44 Collar
45 Thrust bearing
46 Nut
47 Fixed tilt lock gear
471 Gear
472 Groove
473 Inclined face
474 Stepped part
475 Wall
476 Abrupt slope
477 Bolt
48 Tilt stopper
5 Tilt stopper
51 Cylindrical part
52 Flange part
521 Plane
522 Arc-shaped face
523 Right end face
524 Left end face
53 Through hole
54 Slit
55 Fitting protrusion
551 Inclined face
552 Fitting face
56 Groove in shape of circular arc
57 Concave portion in shape of circular arc
6 Movable tilt lock gear
61 Gear
62 Protrusion
63 Through hole
64 Fitting protrusion
65, 66 Fitting concave portion
67 End face
68 End face
7 Wire spring (Spring)
71 Arm part
72, 73 Bent part
74 Coupled part
75 Portion in shape of circular arc
8 Fixed cam
81 Peripheral face
82 Inclined face
83 Plane
84 Through hole
85 Inclined cam face
86 Detent
861 Plane
862 Arc-shaped face
87 Major-diameter peripheral face
88 End face
89 Straight line (Axis of symmetry)

The invention claimed is:
1. A steering device, comprising:
a bracket for installing on a vehicle body attachable to the vehicle body;
a column the tilt position of which is adjustably supported by the bracket for installing on the vehicle body and which turnably supports a steering shaft where a steering wheel is installed;
a clamping rod inserted into a long groove for tilt adjustment formed on each side plate and the column so as to clamp the column on a pair of right and left side plates of the bracket for installing on the vehicle body in a desired tilt position and clamp a tilt;
a fixed cam which is supported by one end of the clamping rod and which presses an inside face of one side plate of the bracket for installing on the vehicle body on the column;
a movable cam turnably supported together with an operating lever by one end of the clamping rod opposite to the fixed cam;
a cam face which is provided to each opposite surface of the fixed cam and the movable cam and which relatively axially presses the movable cam opposite to the fixed cam;
a detent formed on the fixed cam so as to disable the relative turning of the fixed cam for the movable cam, which is fitted into the long groove for tilt adjustment and which can be slid along the long groove for tilt adjustment when the tilt position of the column is adjusted;

a fixed tilt lock gear attached to an outside face of one side plate of the bracket for installing on the vehicle body;

a movable tilt lock gear which is turned in synchronization with the turning of the operating lever and which can be engaged with the taxed tilt lock gear;

a fitting protrusion turned in synchronization with the turning of the operating lever and formed at an end of an elastically deformed part;

a sliding surface which is provided to the bracket for installing on the vehicle body, to which the fitting protrusion is slidably touched and which is ordinarily touchable;

a stepped part which is formed on the sliding surface across length for tilt adjustment, to which the fitting protrusion is fitted when the column is clamped and the tilt is clamped and which blocks the turning in a direction in which clamping is released of the operating lever;

a groove which is formed on the sliding surface across length for tilt adjustment, into which the fitting protrusion is fitted when the clamping of the column is released and unclamping is performed and which blocks the turning of the operating lever; and an inclined face which is formed between the stepped part and the groove of the sliding surface across length for tilt adjustment, on which the fitting protrusion is slid when the operating lever is turned and which ordinarily presses the operating lever in the direction in which the clamping is released.

2. The steering device according to claim 1, wherein the sliding surface is formed as an outside face of the fixed tilt lock gear.

3. The steering device according to claim 2, comprising:
the movable tilt lock gear in which the fixed cam is packaged movably in a tilted direction; and
a spring which is inserted between the movable tilt lock gear and the fixed cam, which grasps a peripheral face of the fixed cam, and which elastically supports the movement in the tilted direction of the movable tilt lock gear in terms of the fixed cam.

4. The steering device according to claim 1, comprising:
the movable tilt lock gear in which the fixed cam is packaged movably in a tilted direction; and
a spring which is inserted between the movable tilt lock gear and the fixed cam, which grasps a peripheral face of the fixed cam, and which elastically supports the movement in the tilted direction of the movable tilt lock gear in terms of the fixed cam.

5. The steering device according to claim 4, wherein, when threads of the movable tilt lock gear and the fixed tilt lock gear are touched in clamping the column on the bracket for installing on the vehicle body, the spring is elastically deformed by reaction force and the movable tilt lock gear is moved in the tilted direction opposite to the fixed tilt lock gear.

6. The steering device according to claim 5, wherein, when the clamping of the column on the bracket for installing on the vehicle body is released, the engagement of the movable tilt lock gear with the fixed tilt lock gear is easily disengaged owing to clearance in a vertical direction in the vehicle body between the fixed cam and the movable tilt lock gear.

7. The steering device according to claim 1, wherein the operating lever is made of synthetic resin; and
wherein the fitting protrusion is integrated with the operating lever.

8. The steering device according to claim 7, comprising:
the movable tilt lock gear in which the fixed cam is packaged movably in a tilted direction; and
a spring which is inserted between the movable tilt lock gear and the fixed cam, which grasps a peripheral face of the fixed cam, and which elastically supports the movement in the tilted direction of the movable tilt lock gear in terms of the fixed cam.

* * * * *